United States Patent
Okada et al.

(10) Patent No.: US 9,071,830 B2
(45) Date of Patent: Jun. 30, 2015

(54) INFORMATION PROCESSING APPARATUS AND INFORMATION PROCESSING METHOD

(75) Inventors: Shunji Okada, Kanagawa (JP); Takashi Kuwabara, Tokyo (JP); Kazuya Yokoyama, Chiba (JP); Kenichiro Aridome, Kanagawa (JP); Atsushi Mae, Kanagawa (JP); Kenichiro Nagao, Tokyo (JP); Shinya Kano, Kanagawa (JP)

(73) Assignee: Sony Corporation (JP)

( * ) Notice: Subject to any disclaimer, the term of this patent is extended or adjusted under 35 U.S.C. 154(b) by 504 days.

(21) Appl. No.: 12/803,536

(22) Filed: Jun. 29, 2010

(65) Prior Publication Data

US 2011/0007131 A1    Jan. 13, 2011

(30) Foreign Application Priority Data

Jul. 10, 2009    (JP) ................ P2009-164050

(51) Int. Cl.
*H04N 13/00* (2006.01)
*A61B 1/04* (2006.01)
*H04N 13/02* (2006.01)
*H04N 13/04* (2006.01)
*G06K 9/00* (2006.01)
*H04N 19/597* (2014.01)

(52) U.S. Cl.
CPC ....... *H04N 13/0235* (2013.01); *H04N 13/0022* (2013.01); *H04N 13/0048* (2013.01); *H04N 13/0055* (2013.01); *H04N 13/0066* (2013.01); *H04N 13/007* (2013.01); *H04N 2213/003* (2013.01); *H04N 19/597* (2014.11)

(58) Field of Classification Search
CPC .............. H04N 9/8042; H04N 9/8205; H04N 19/00769; H04N 13/0055; H04N 13/0059; H04N 13/0239; G02B 27/22; G02B 2027/0134; G03B 35/00; G09G 5/006; G06T 2207/10012
USPC ............................. 348/42–60; 382/106, 154
See application file for complete search history.

(56) References Cited

U.S. PATENT DOCUMENTS

| | | | |
|---|---|---|---|
| 6,246,415 B1 * | 6/2001 | Grossman et al. | 345/422 |
| 2006/0126919 A1 * | 6/2006 | Kitaura et al. | 382/154 |
| 2006/0192851 A1 * | 8/2006 | Sugahara et al. | 348/51 |
| 2008/0158347 A1 * | 7/2008 | Liu et al. | 348/51 |
| 2010/0188572 A1 * | 7/2010 | Card, II | 348/468 |

FOREIGN PATENT DOCUMENTS

JP    2009-059113 A    3/2009

* cited by examiner

*Primary Examiner* — Joseph Ustaris
*Assistant Examiner* — Farhan Mahmud
(74) *Attorney, Agent, or Firm* — Lerner, David, Littenberg, Krumholz & Mentlik, LLP

(57) ABSTRACT

An information processing apparatus includes a depth-information detecting section, a comparison/detection section, and a control unit. The depth-information detecting section is provided for detecting a peak position of an object in a depth direction, at which the object is displayed at the front in an additional information display area. The comparison/detection section is provided for making a comparison between depth information of the additional information and the peak value of the stereoscopic video data to detect a positional relationship between the stereoscopic data and the display position of the additional information in the depth direction. The control unit is provided for controlling the stereoscopic video data and the display position of the additional information in response to the positional relationship between the stereoscopic video data and the display position of the additional information.

14 Claims, 14 Drawing Sheets

INFORMATION PROCESSING APPARATUS AND INFORMATION PROCESSING METHOD

CROSS-REFERENCE TO RELATED APPLICATION

The present application claims priority from Japanese Patent Application No. JP 2009-164050 filed in the Japanese Patent Office on Jul. 10, 2009, the entire content of which is incorporated herein by reference.

BACKGROUND OF THE INVENTION

1. Field of the Invention

The present invention relates to an information processing apparatus and an information processing method. More specifically, the present invention relates to an information processing apparatus and an information processing method, which control the representation of stereoscopic videos and stereoscopic images on which additional information is superimposed and displayed.

2. Description of the Related Art

In recent years, image pickup apparatuses and recording devices for recording videos and still pictures in a stereoscopic manner have been developed. Motion images and still images recorded in such a manner are output as stereoscopic videos and stereoscopic still images, allowing the user to watch and listen to the shot videos and still images with more realistic sensations. Techniques for making such stereoscopic video and stereoscopic images easier to be watched and listened have been proposed. For example, Japanese Published Patent Application No. 2009-59113 discloses a stereoscopic image generator that carries out a process of generating a stereoscopic image for print by superimposing a composite target image onto a background image. This stereoscopic image generator acquires depth information about the portion of the background image corresponding to the location of the composite target image and then superimpose the composite target images as many as the number of eyes for the composite target image corresponding to the depth information, thereby generating a stereoscopic image for print. In this way, determining the number of eyes for the composite target image leads to the generation of a stereoscopic image for print, which can be easily observed.

SUMMARY OF THE INVENTION

When reproducing a recorded stereoscopic video or stereoscopic image, a reproducing apparatus may indicate additional information, such as shooting date and time and caption, to allow the user to visually recognize the information associated with the stereoscopic video or stereoscopic image at once. The additional information, such as caption, can be displayed as a video or a still image on a recorded stereoscopic video or stereoscopic image at a fixed position defined in vertical and horizontal directions on a screen while being superimposed with a distance in depth direction at the fixed position. Even in the case of superimposing the additional information on the stereoscopic video or stereoscopic image and then displaying the additional information, it has been demanded to provide a video or image which can be easily watched and listed by the user.

In general, additional information has been displayed on a fixed position without considering the contents of a stereoscopic video or stereoscopic image.

However, various kinds of videos may be taken when shooting the videos.

Thus, further additional information, such as clock information, measurement information for shooting with camera, and information about the amount of data stored in media, may be also recorded in addition to caption information.

In the case of a motion picture recorded in a stereoscopic manner, the position of an object in the depth direction in the video can be also recognized. However, the positions of the respective objects in the depth direction may be different from one another and vary from time to time. Furthermore, a zooming or switching operation of telephoto/wide angle as a shooting field angle may be performed and changed in an unpredictable manner due the shooter's situation or original idea of shooting.

Since such a change in contents of video is unpredictable before shooting, there is an undesired possibility of disrupted display of a stereoscopic video when additional information is displayed at a fixed position defined in vertical and horizontal directions on a screen while the distance in depth direction is being fixed.

Therefore, it is desirable to provide a novel, improved information processing apparatus and information processing method, where a stereoscopic video which can be easily watched and listened even when the stereoscopic video and the additional information are superimposed on each other.

According to a first embodiment of the present invention, there is provided an information processing apparatus that includes a depth-information detecting section, a comparison/detection section, and a control unit.

In such a information processing apparatus, the depth-information detecting section detects, based on a depth information representing a position of an object in stereoscopic video data in a depth direction, which is determined at the time of shooting and recording, a peak position of the object in the depth direction, at which the object of the stereoscopic video data is displayed at the front in an additional information display area where additional information data is superimposed and displayed with the stereoscopic video data. In addition, the comparison/detection section makes a comparison between depth information of the additional information and the peak value of the stereoscopic video data to detect a positional relationship between the stereoscopic data and the display position of the additional information in the depth direction in the additional information display area.

The control unit controls the stereoscopic video data and the display position of the additional information in response to the positional relationship between the stereoscopic video data and the display position of the additional information.

According to the embodiment of the present invention, based on depth information representing a position of an object in stereoscopic video data in a depth direction, the display positions of the stereoscopic video data and the additional information data are controlled. when an angle of view of the video display is changed by optically or electronically telephoto or wide zooming to record or reproduce a subject object located far in scale up or scale down at the time of shooting or recording a video, in consideration of the positional relationship between the stereoscopic video data and the additional information data in the depth direction on the stereoscopic display screen, both the video data and the additional information are recorded while being controllable in display. Thus, visually recognizable stereoscopic video data can be provided.

Here, when the comparison/detection section is determined that the object of the stereoscopic video data is displayed in front of additional information, the control unit can display the object of the stereoscopic video data in an additional information display area at the back of the additional information.

The information processing apparatus may further include an overtime detection unit detecting overtime where the object of the stereoscopic video data is displayed in front of the additional information by the comparison/detection section. In this configuration of the information processing apparatus, the depth-information detecting section may detect the position, at which the object is displayed in front of the additional information in the additional information display area in the depth direction, as a unit peak value for every basic unit of the stereoscopic video data. The comparison/detection section makes a comparison between the position of the additional information data in the depth direction and the unit average value to detect a positional relationship between the object of the stereoscopic video data and the additional information in the additional information display area. When the overtime exceeds a first threshold time, the control unit may display the object of the stereoscopic video data at the back of the additional information in the additional information display area.

Furthermore, when the overtime exceeds the first threshold time, the control unit may provide a user with a message that allows the user to determine whether display control of the stereoscopic video data and the additional information data should be performed.

The control unit may display a background video of the additional information data with increased transparency to allow the object of the stereoscopic video data superimposed with the background video to be visually recognized. Here, for example, the background video may be a character background which can be displayed while occupying a predetermined area of a screen.

Alternatively, when the comparison/detection section determines that the object of the stereoscopic video data is displayed in front of the additional information, the control unit displays the additional information data so that a portion superimposed with the object of the stereoscopic video data is hidden behind the object.

Here, the information processing apparatus may further include an overtime detection unit that detects overtime where the object of the stereoscopic video data is displayed in front of the additional information by the comparison/detection section. For example, when the overtime is displayed in front for just a moment and determined as one that does not prevent the user from viewing and listening to the additional information expression. It may be naturally displayed in front for a moment. At this time, the depth-information detecting section detects a unit average value which is an average of positions in the depth direction at which the object is displayed in the additional information display region for every basic unit of the stereoscopic video data. The comparison/detection section makes a comparison between the position of the additional information data in the depth direction and the unit average value to detect a positional relationship between the object of the stereoscopic video data and the additional information in the additional information display area. The control unit displays, when the overtime exceeds a second threshold time, the additional information data so that a portion superimposed with the object of the stereoscopic video data is hidden behind the object.

When the overtime exceeds the first threshold time, the control unit may provide a user with a message that allows the user to determine whether display control of the stereoscopic video data and the additional information data should be performed.

The display position of the additional information data in the depth direction may be a fixed position.

Furthermore, both the stereoscopic video data and the additional information data are recorded in AVCHD format.

The depth information for every basic unit of the stereoscopic video data may be recorded together with the stereoscopic video data for every basic unit.

According to another embodiment of the present invention, there is provided an information processing method including the steps of: based on a depth information representing a position of an object in stereoscopic video data in a depth direction, detecting a peak position of the object in the depth direction, at which the object of the stereoscopic video data is displayed at the front in an additional information display area where additional information data is superimposed and displayed with the stereoscopic video data; making a comparison between depth information of the additional information and the peak value of the stereoscopic video data; detecting a positional relationship between the stereoscopic data and the display position of the additional information in the depth direction in the additional information display area from a result of making a comparison between depth information of the additional information and the peak value of the stereoscopic video data to detect; and controlling the stereoscopic video data and the display position of the additional information in response to the positional relationship between the stereoscopic video data and the display position of the additional information.

According to any of the embodiments of the present invention as described above, the information processing apparatus and the information processing method, which can allow the user to easily watch and listen s stereoscopic video and additional information even if they are superimposed on each other, can be provided.

DESCRIPTION OF THE PREFERRED EMBODIMENTS

The suitable embodiment of the present invention is described in detail, referring to an accompanying drawing below. In this specification and a drawing, duplication explanation is omitted by attaching the same mark about the constituent factor which has the same functional constitution substantially.

Explanation shall be given in following order:
1. First embodiment
(display control of stream for stereoscopic video and overlay bitmap)
2. Second embodiment
(conversion of stereoscopic video stream and MP4 stream recorded in AVCHD format)

1. First Embodiment

Explanation of Display Control Mode

Figure 1:
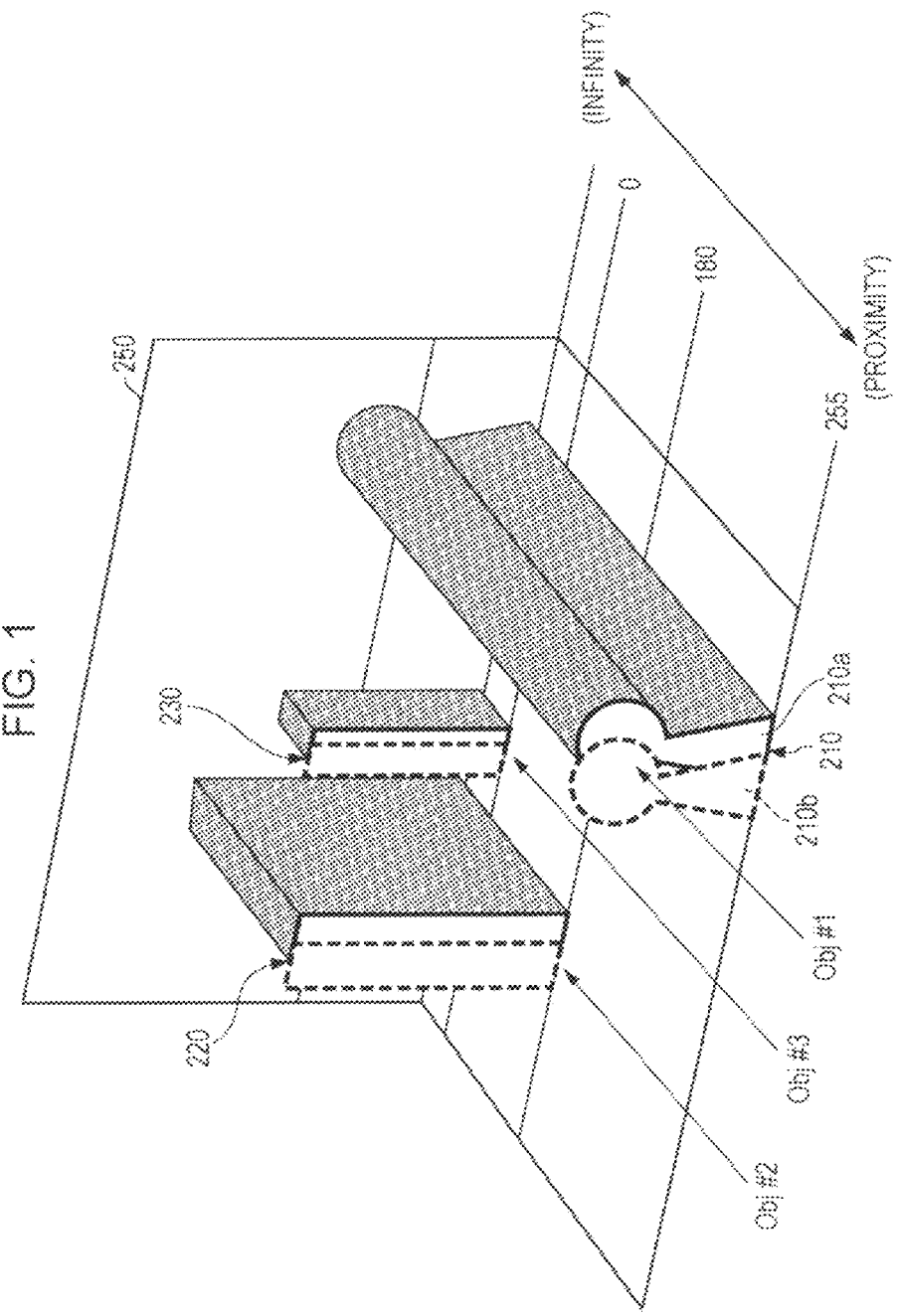
FIG. 1 is an explanatory diagram illustrating a display state in a non-display (hide) mode where the stereoscopic video stream is only displayed.
Figure 2:
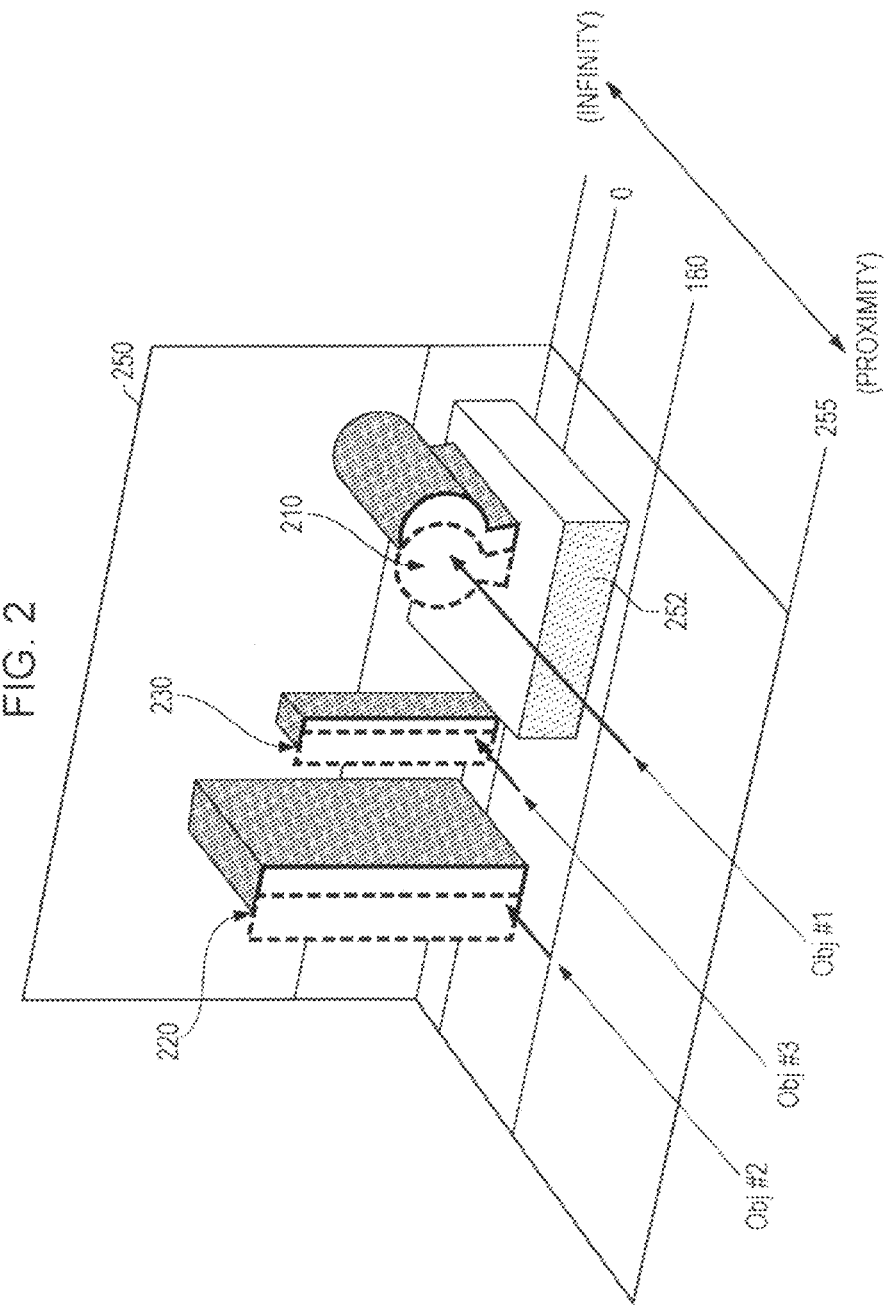
FIG. 2 is an explanatory diagram illustrating a display state in a pinning display control mode where a stereoscopic video stream and an overlay bitmap are displayed.
Figure 3:
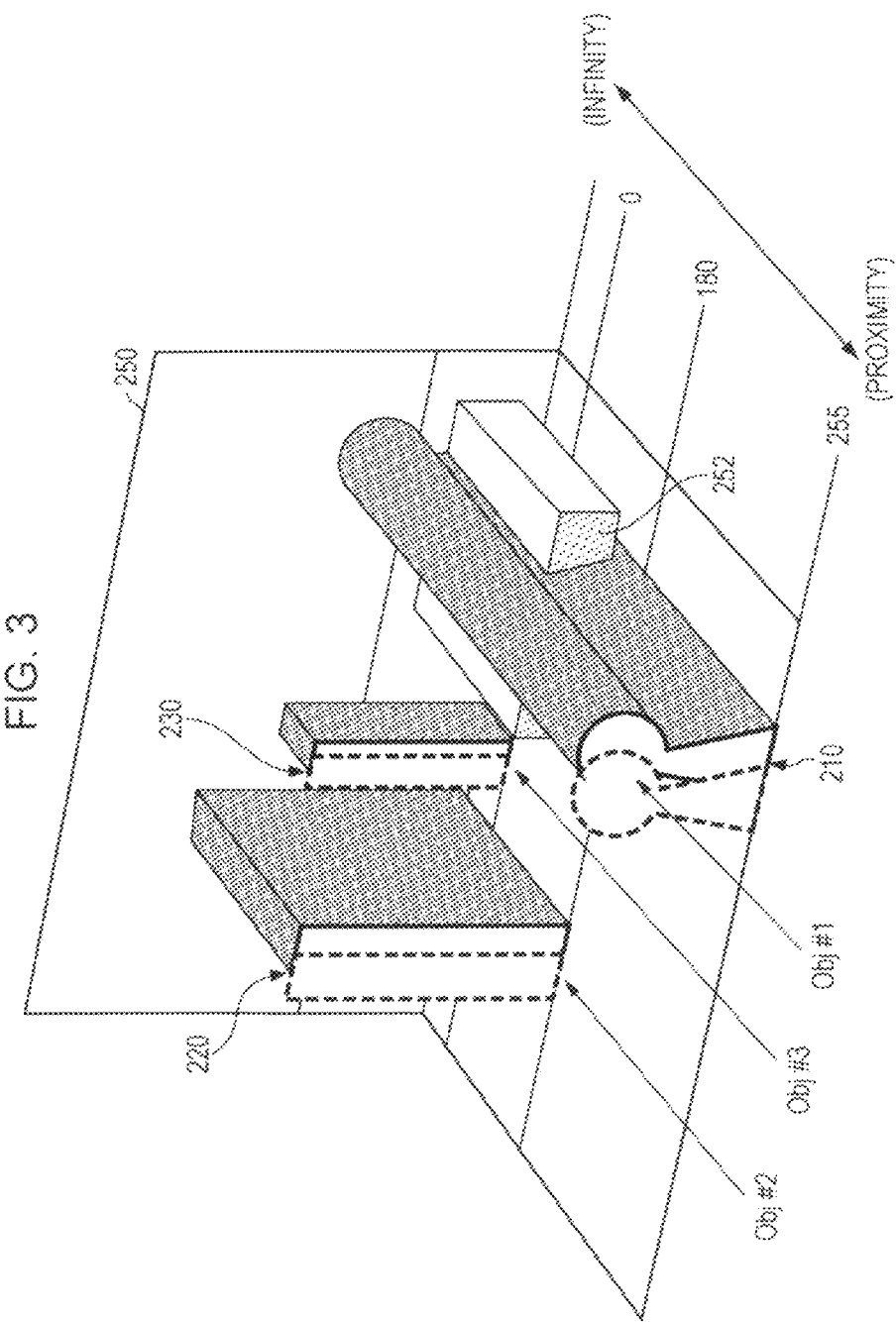
FIG. 3 is an explanatory diagram illustrating a display state in an embedding display control mode where a stereoscopic video stream and an overlay bitmap displayed.

Referring first to FIG. 1 to FIG. 3, a display control mode for overlay bitmap, which is a stereoscopic video stream and additional information, by a reproducing apparatus according to a first embodiment of the present invention will be described. Specifically, FIG. 1 is an explanatory diagram illustrating a display state in a non-display (hide) mode where the stereoscopic video stream is only displayed. FIG. 2 is an explanatory diagram illustrating a display state in a pinning display control mode where a stereoscopic video stream and an overlay bitmap are displayed. FIG. 3 is an explanatory diagram illustrating a display state in an embedding display control mode where a stereoscopic video stream and an overlay bitmap displayed.

Here, in the description of the present embodiment, each of the terms "pinning display control mode" and "embedding display control mode" is provided for defining a concept of controlling a positional relationship between a position at which the depth direction of the stereoscopic video stream is displayed and a position at which the depth direction of the stereoscopic video stream is displayed, which can be redisplayed on a stereoscopic display apparatus. A position at which the depth direction of the overlay bitmap for stereoscopic display of additional information is displayed The depth direction display position of overlay bitmap which carries out the stereoscopic vision indication of the attached information. The details will be described later.

The reproducing apparatus of the present embodiment includes a display control unit that controls the display of a stereoscopic video stream and an overlay bitmap in a display control mode to provide a stereoscopic video stream which can be easily listened and watched. The display control unit controls the display of overlay bitmap so that the display of the contents of the stereoscopic video stream can be prevented from being interrupted and the overlay bitmap can be displayed at an appropriate position where it can be easily watched and listened. To perform such a display control, the reproducing apparatus of the present embodiment is provided with three display control modes.

First, in a non-display mode for only displaying a stereoscopic video but not displaying the overlay bitmap, as shown in FIG. 1, a stereoscopic video stream can be displayed in a state of being recorded when shooting. In FIG. 1, a plurality of objects 210, 220, and 230 is displayed in a display area 250. When the reproduced video of the stereoscopic video stream is displayed on a reproducing apparatus for stereoscopic video, each of the objects 210, 220, and 230 is constructed of a left eye picture and a right eye picture so that it can be viewed with left-and-right parallax. In the case of object (Obj) #1 (210), an actual picture is used as a left eye picture 210a, while a right eye picture 210b is generated by horizontal offset of the left eye picture 210a to the left side. Thus, the object (Obj) #1 (210) can be stereoscopically formed.

The depth information of each of the objects and background in the stereoscopic video stream is held as depth map data. The depth map data includes a depth map value for each pixel or macro block in one screen. The depth map value can be generated using the depth of lens field among information about auto focus (AF) of a camera unit 101 that shoots videos. The depth map value to be generated is a larger value at a close distance and a smaller value at a far distance corresponding to a subject distance measured by optical and electronic zoom as well as focusing operation. In the present embodiment, a depth map value to be used is one obtained as shooting information in shooting with a camera so that the measured subject distance is assigned with two to the eighth power, an eight-bit value. In contrast, zero (0) is assigned to the infinity and numeral 255 is assigned to the nearest distance in a decadal system.

Here, an example of the method of generating the depth map data will be described. First, the lens focal point is set to "infinity" (>5 m) by the minimum depth of lens field by opening an aperture at the wide angle of the lens. The reason of setting the infinity to >5 m is based on a fact that an object beyond 5 m is hardly recognized with a stereoscopic effect by the left-and-right parallax as long as the angle of view of the lens is the wide end on the wide-angle side (e.g., the angle of view corresponding to 28 mm lens equivalent of 35 mm film). Under such a state, a video area to be focused in the screen is recognized and set to a background area. The depth map value of the background area is set to zero (0) bit.

Next, the lens focal point is set to a "short distance (proximity)" (0.5 m) by the minimum depth of lens field by opening an aperture at the wide angle of the lens. The reason of setting the short distance to 0.5 mm is as follows: On the premise of listening and watching the display of stereoscopic video by a viewer located at a fixed position, it is not appropriate to allow the viewer to listen and watch an object at a distance of less than 5 m because the interval distance of the left and right human eyes is less than 0.1 m and the object is hardly recognized with an excessive stereoscopic effect by the left-and-right parallax even when the angle of view of the lens is the wide end on the wide-angle side (e.g., the angle of view corresponding to 28 mm lens equivalent of 35 mm film). In addition, the distance, which is perceived by the viewer as a result of as if the foreground and the background are shifted from each other when the viewer moves 10 cm or more horizontally while the interval between the left and right eyes keeps their positional relationship, is much different from the distance perspective given by a left-and-right stereoscopic video of the present embodiment.

Under such a state, a video area to be focused in the screen is recognized and set to a nearest distance point. Here, the depth map value of the nearest distance point is set to 8 bits, the decimal numeral 255, which is the maximum value in the range of two to the eighth power bits, when it is assigned to two to the eighth power bits.

Then, at the lens wide end, the focus of the lens is gradually changed from a short distance (0.5 m) to an infinite distance (>5 m) under the conditions of the minimum depth of lens field and the opened aperture at the wide angle of the lens. At this time, a bit value exponentially expressing a difference in surface area to be focused is assigned for every focal distance of the lens. Subsequently, a distance measurement is performed while adjusting the position of the lens and video areas to be focused in the screen area are then sequentially recorded in synchronization with the distance measurement. For example, the depth map value is the decimal numeral 180, two to the eighth power, when the measured distance is one meter (1 m). In addition, for example, the depth map value is the decimal numeral 100 when the measured distance is two meters (2 m).

Photographic objects in the range of the depth map values are objectively recognized in an individual or collective manner. After initializing the depth map value at the time of shooting, the movement of an object to be shot is followed by a motion vector to continuously recognize the profile of the object, thereby determining the measured focal distance of the lens from a zoom lens and a focus lens in an optical system. Thus, each depth map value of the depth map data can be continuously assigned to the area in the video profile of each photographic object.

Furthermore, the generation of a depth map when shooting at the telephoto end of the optical lens will be described. At this time, a distance measurement is carried out while controlling the depth of lens field to the lowest one by opening an aperture. Therefore two kinds of the telephoto end, one for an optical zoom in which a high magnification can be obtained by an optical lens with an increase in angle of the view of the video and the other for an electronic zoom with poor magnification using part of the high-resolution image-pickup device. In generational, when an object is stereoscopically shot using only the left-and-right parallax of two eyes, it has been considered that stereoscopic shooting can be difficult at the time of optical zoom because of no generation of left-and-right parallax. In this embodiment, however, such difficulty can be improved using a depth map stream for shooting and recording a video. In other words, even when a certain angle of view is shot at the telephoto end, the generation of a depth map stream is performed using a measurement of distance from a subject and a video is then recorded. Then, a video is reproduced and outputted as a stereoscopic video stream with the left-and-right parallax from both the video and the depth map stream at the time of shooting. Shooting of a stereoscopic video can be attained even at the time of optical zoom shooting.

The lens is set to the telephoto end of the optical zoom and the lens focal point is set to infinity (>500 m). Here, when the lens has an angle of view corresponding to the telephoto end on the telescopic side (e.g., the angle of view corresponding to 135 mm lens equivalent of 35 mm film), in a manner similar to the assignment of a depth map by focus control to a subject at a wide angle of view, the decimal representation of 8 bits, 255, is assigned when a measured distance to be assigned to the depth map is located at a short distance of <50 m. In contrast, the decimal representation of 8 bits, 0 (zero), is assigned when a measured distance to be assigned to the depth map is located at a far distance of >500 m. In a manner similar to one described above, the decimal values of the depth map corresponding to the measured distances between them are assigned by those of 8 bits on an exponential line from 50 m to 500 m, respectively.

With respect to the zooming behaviors of a zoom lens group and a focus lens group, which constitute an optical lens group, first, an angle of view is determined at a control position of the zoom lens group and the optical system is then focused on a subject by adjusting the focus of the focus lens group. Therefore, a clear video of the target subject can be shot. The characteristics of the position of the zoom lens group in a lens mechanism at this time and the characteristics of the control position of the corresponding focus lens group being focused are uniquely determined at the time of designing and manufacturing the lenses. Thus, the distance measurement can be performed at the focus position even at the time of an increase in zoom angle of view. Therefore, just as in the case of the angle of view at the wide angle, the shooting and recording of a stereoscopic video can be realized by assignment of a depth map when an angle of view is enlarged by optical or electronic zooming.

In this way, the stereoscopic video stream manages depth information as the depth map data of the subject object. In a video picture shown in FIG. 1, the depth map value of object #1 (210) at the shortest measurement distance is the largest among three objects (e.g., the decimal representation of 8 bits, 180, at a measurement distance of 1 m). Then, the depth map values of object #2 (220) and object #3 (230) located on the back side of the object #1 (210) become small as they move back (e.g., in the case of an angle of view at the wide end, the decimal representation of 8 bits at a measurement distance of 2 m is 100 and the decimal representation of 8 bits at a measurement distance of 5 m is zero (0)).

Next, if a display control is carried out with a pinning display control mode which is defined in the description of the present embodiment, the stereoscopic video stream and the overlay bitmap can be represented as shown in FIG. 2. In the pinning display control mode, a display control unit controls an object of a stereoscopic video stream displayed on the display area of the overlay bitmap (hereinafter, referred to as an "OB display area") 252 so that it is displayed on the back side of the displayed stereoscopic screen from the displayed position of the overlay bitmap, viewed from a viewer at the overlay bitmap.

For example, if the viewer intends to display additional information such as a capture and clock information in preference to the shot stereoscopic video stream, a pinning display control mode which is defined in the description of the present embodiment can be used. In a pinning display control mode, a display control unit controls object #1 (210) located in the OB display area 252 to become the back side rather than the display position of overlay bitmap to be shown in FIG. 2. Therefore, it becomes possible to prevent the additional information from being hidden by the object located at the OB display region 252.

On the other hand, if a display control is carried out with an embedding display control mode which is defined in the description of the present embodiment, the stereoscopic video stream and the overlay bitmap can be represented as shown in FIG. 3. In the embedding display control mode, an object of a stereoscopic video stream displayed on the OB display area 252 is displayed on the front side from the displayed position of the overlay bitmap, viewed from a viewer at the overlay bitmap. At this time, part of the overlay bitmap, which is overlapped with the object #1 (210), is hidden by the object #1 (210). The embedding display control mode allows the stereoscopic video stream to be prevented from being hidden by the overlay bitmap.

Therefore, the reproducing apparatus of the present embodiment can offer a stereoscopic video stream which can be easily listened and watched by controlling the display of a stereoscopic video stream and overlay bitmap based on the depth map data. Hereinafter, the configuration of the reproducing apparatus of the present embodiment and a display control method using such a reproducing apparatus will be described in detail.

[Configuration of Image Pick-Up/Recording Apparatus]

Figure 4:
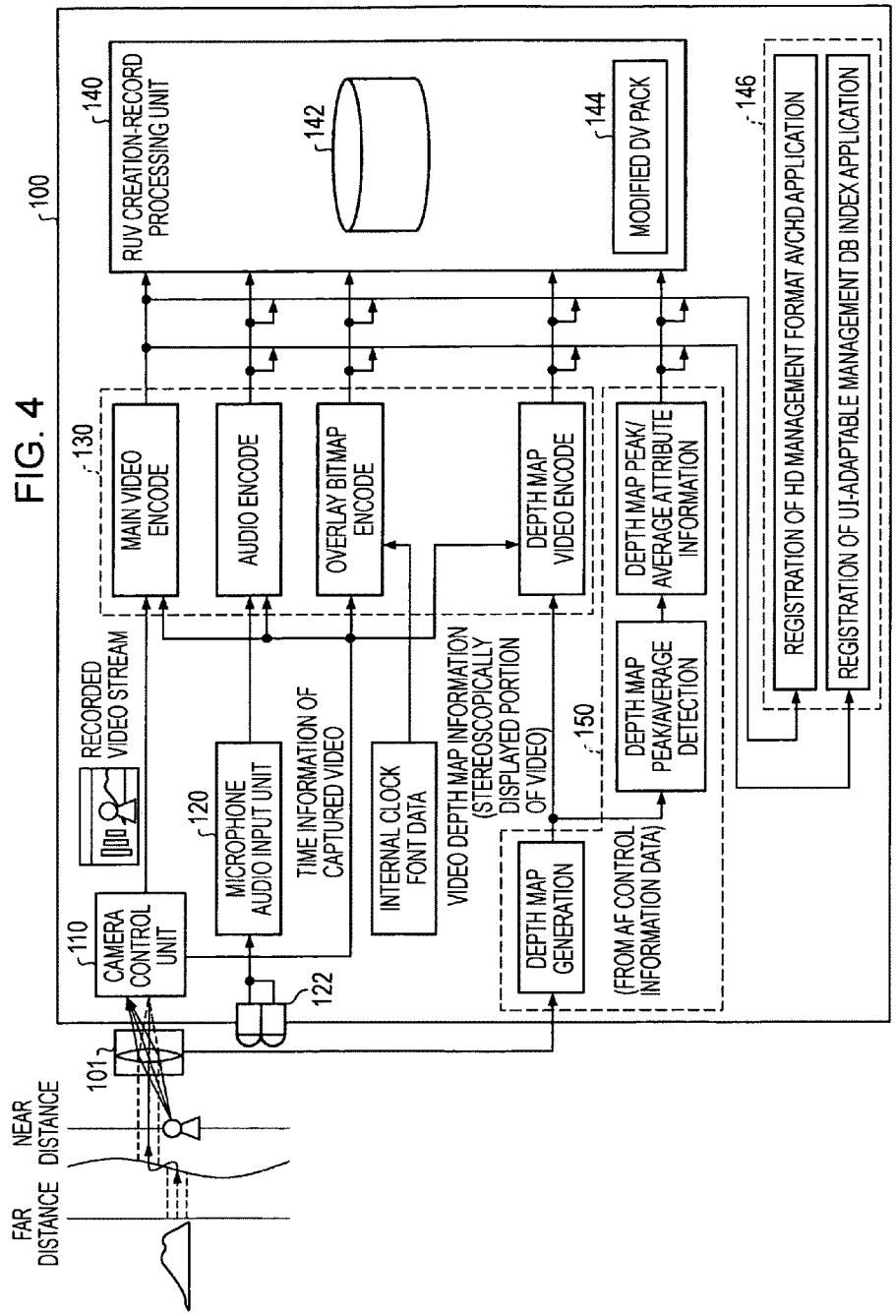
FIG. 4 is a block diagram illustrating an input/recording processing part of an image-pickup/recording apparatus of the present embodiment.
Figure 5:
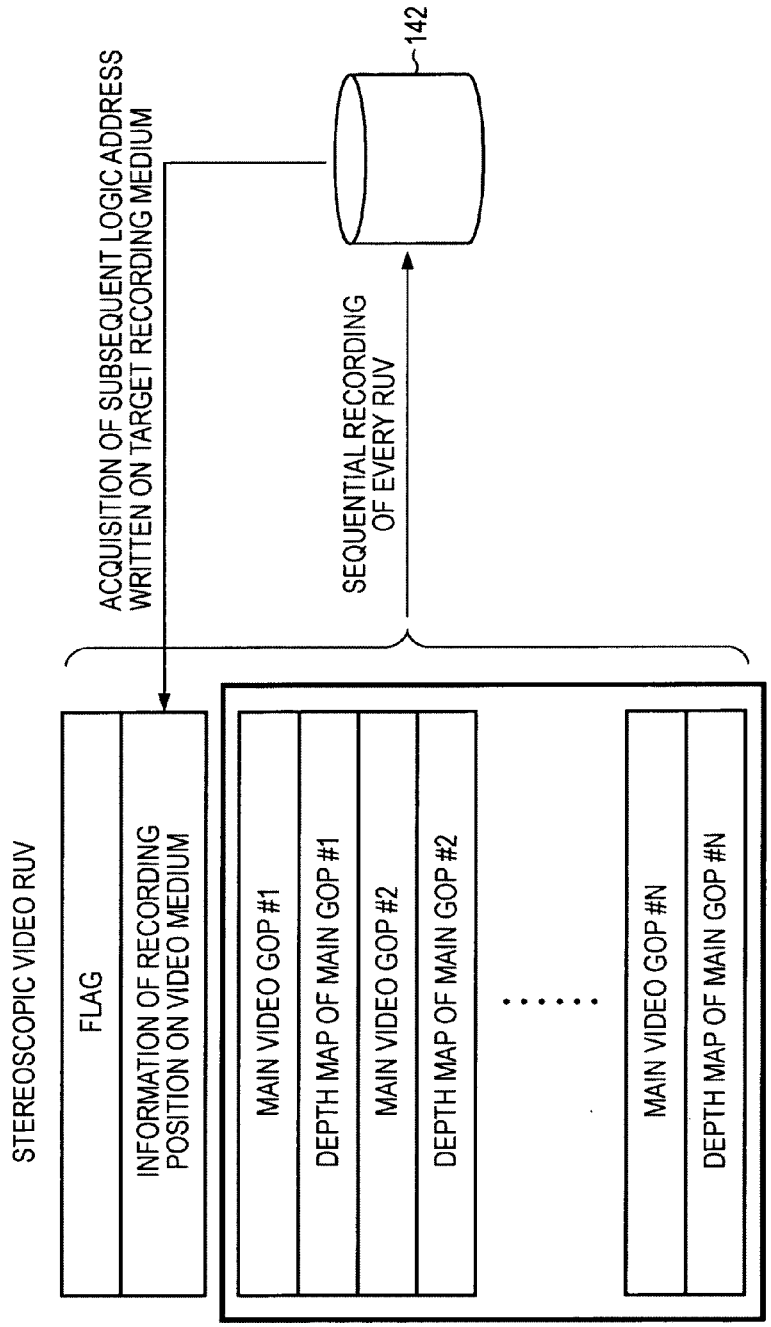
FIG. 5 is an explanatory diagram illustrating the relation between a stereoscopic video RUV and a recording medium.
Figure 6:
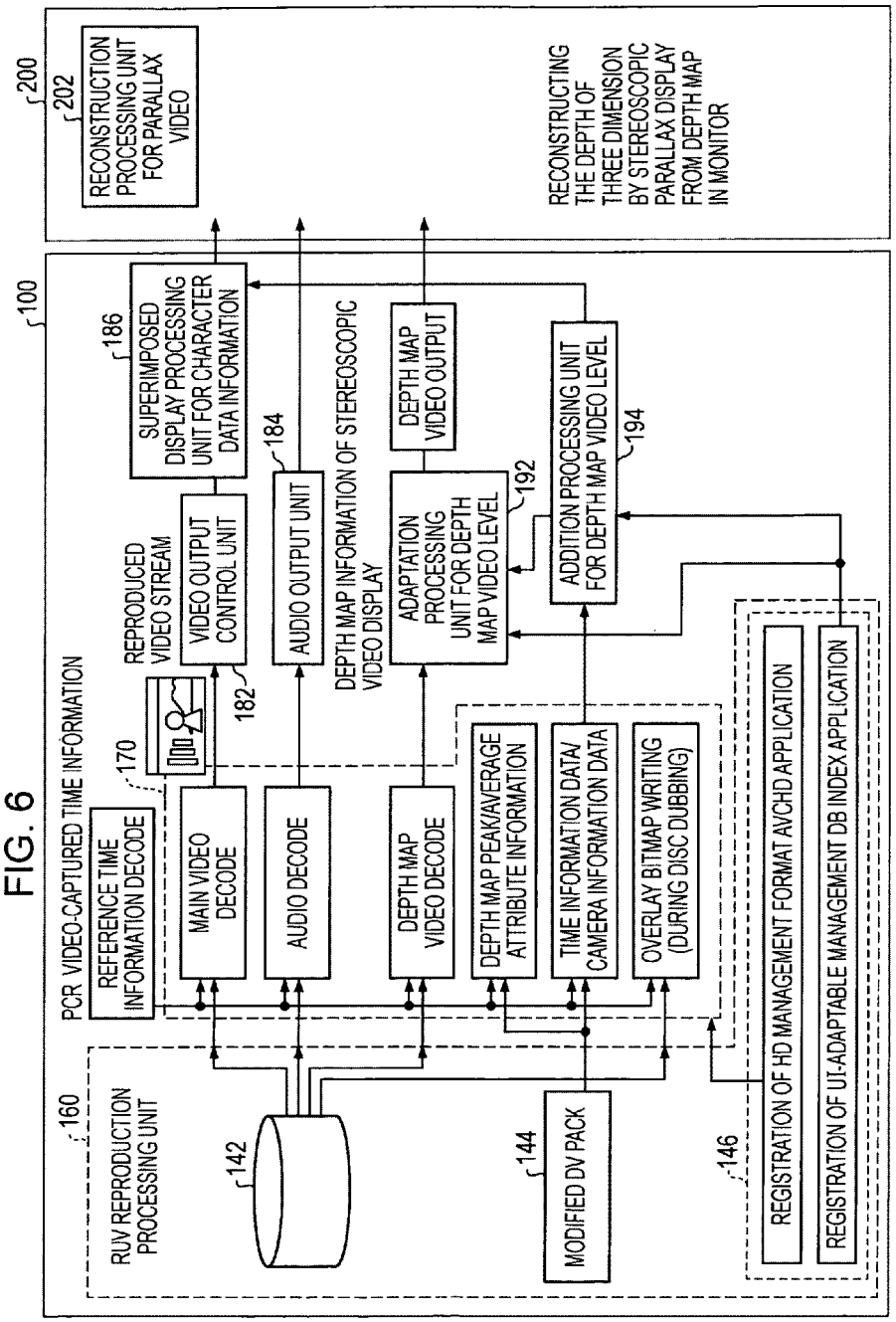
FIG. 6 is a block diagram illustrating a reproduction/output processing part of image-pickup/recording apparatus of the present embodiment.

Before the description of the reproducing apparatus of the present embodiment, an image pick-up/recording apparatus according to an embodiment of the present invention, which is provided for recording a video captured by an image pickup unit, will be described with reference to FIG. 4 to FIG. 6. FIG. 4 is a block diagram illustrating an input/recording processing part of an image-pickup/recording apparatus 100 of the present embodiment. FIG. 5 is an explanatory diagram illustrating the relation between a stereoscopic video RUV and a recording medium. FIG. 6 is a block diagram illustrating a reproduction/output processing part of image-pickup/recording apparatus 100 of the present embodiment.

In this embodiment, the present embodiment describes a case in which a video captured by the image-pickup/recording apparatus is recorded as a stereoscopic video stream in AVCHD format and then reproduced by a reproducing apparatus.

Here, the image-pickup/recording apparatus 100 has a reproduction function for reproducing the recorded stereoscopic video stream. Examples of the image-pickup/recording apparatus 100 may include a camcorder (video camera recorder), a digital camera with video capturing function, and a video portable device, which are capable of encoding stereoscopic video streams and depth map data, recording them on recording media, such as flash memory drives and hard disks, and reproducing the recorded stereoscopic video streams.

(Configuration and Function of Input/Recording Processing Part of Image-Pickup/Recording Apparatus)

The input/recording processing part of image-pickup/recording apparatus 100 of this embodiment includes, as shown in FIG. 4, a camera unit 101 functioned as an image-pickup unit for capturing a video, a camera control unit 110, a microphone 122, and a microphone audio input unit 120. The camera control unit 101 controls the camera unit 101 constructed of an imaging device, a lens, and so on to acquire a video captured by the camera unit. The microphone audio input unit 120 inputs audio information obtained through the microphone 122. The audio information is preferably in stereo sound system or 5.1-ch surround sound audio system.

The camera control unit 110 outputs the recorded video stream captured by the camera unit 101 to an encode unit 130. The microphone audio input unit 120 outputs the audio information input from the microphone 122 to the encode unit 130. The encode unit 130 encodes the recorded video stream input from the camera control unit 110 (main video encode) and also encodes the audio information input from the microphone audio input unit 120 (audio encode).

In addition, additional information, such as a time stamp and parameters for video camera control, are output as shooting-information parameters at the time of shooting a video to generate an overlay bitmap of the additional information. In the following description, the present embodiment will be described especially with respect to a case in which the clock information of the captured image is recorded as additional information. At this time, the image-pickup/recording apparatus 100 memorizes the font data for the time information of the captured video as individual graphic fonts in a font data memory (not shown) where the data is being compressed in compression mode defined by AVCHD format. The image-pickup/recording apparatus 100 arranges the fonts acquired from the font data memory as overlay bitmap data and then generates the image of the time information of the captured video input from the camera control unit 110. Then, the encode unit 130 encodes an overlay bitmap stream is encoded as an image of the generated clock information of the captured vide (overlay bitmap encode).

Here, the overlay bitmap data, caption data of Blu-Ray (registered trademark)/AVCHD, will be described. The stream classification of overlay bitmap data is a data type which constitutes a transport stream. The overlay bitmap has the following control specifications.

First, a display style (e.g., for the recording date, "YMD", "DMY", or "unrecorded") is specified and determined by the user until the start of record. These settings may be unchanged during the recording. The overlay bitmap is recorded during the recording of motion pictures. The recording date may be the same as the clock information described in the inside of the stream or the clock information of the modified DV pack. Here, if "overlay bitmap is not recorded" is selected in the display style, the overlay bitmap stream itself is set to be unrecorded.

An optical disc reproducing apparatus (e.g., a Blu-Ray (registered trademark) player or an AVCHD record DVD player) can switch the display/hide of overlay bitmap.

The data of one overlay bitmap (Display Set) includes the following segments: One entry point (1 EP) records a piece of datum. Five segments (PCS, WDS, PDS, ODS, END; = 5PESPacket) are provided in the 1 EP for every function.

PCS (Seg PCS; Presentation Composition Segment information) is segment data that defines a display configuration (presentation). Each of objects, such as a character to be displayed, is the bitmap data of fonts. The data is compressed and recorded rather than remains as it is.

WDS (Seg WDS; Window Definition Segment information) is segment data that defines one screen configuration (Window Definition). PDS (Seg PDS; Palette Definition Segment information) is segment data that defines a color palette (Pallet Definition). Although the data of each character font to be displayed is the compressed data of each bit map and the display color thereof is specified by this digital data. ODS (Seg ODS; Object Definition Segment information) (except RLE) is segment data that defines a display object. END (Seg END; End of Display Set Segment information) is segment data that represents the end of a display data set.

These segment data are recorded so that it is recorded while coexisting with a data set collected as a display set in the 1 EP (here, an example in which 1 GOP includes 15 video frames) of the TS stream. The 1 EP includes video frame (Video Frame I-pic/P-pic/B-pic). In an example of the recorded video stream of the present AVCDH system HD video camera, immediately after one I-picture every one GOP, the overlay bitmap data collectively records the following display set with the addition of the corresponding PTS so as to correspond with the reproduced image display time PTS (Presentation Time Stamp).

The reproduction player according to the present embodiment reads and reproduces this overlay bitmap at the time of the reproduction. The overlay bitmap to be recorded and overlapped on motion pictures at the time of the reproduction includes 15 segments in rows so as to correspond to the respective 15 video frames in the 1 EP, while each segment includes "Display/Set/PCS/WDS/PDS/ODS/END" in column. Since each of WDS, PDS, and ODS may be only defined once in the 1 EP, the second and subsequent segments may include "Display/Set/PCS/END". Here, although the example in which the 1 EP includes 15 segments has been described, the 1EP may include about 10 to 15 segments.

The bitmap data of the character fonts is defined in specifications using the Run Length coded compression, one of simple data compression techniques. For example, one character font data can consist of 10 [Pixels]×14 [Lines]. It can be directly employed for the caption of the frame video stream in progressive mode. In contrast, in the case of the caption of the field video stream in interlaced mode, "Top/Bottom" is previously defined. The class and name of each segment containing the overlay bitmap of the TS stream will be described later with reference to FIG. 9.

The encode unit 130 holds the clock information of the captured video input from the camera control unit 110 as the additional information in the video stream. TS packets are provided with PIDs for the respective types of data and encoded together with the recorded vide stream, audio information, overlay bitmap, and depth map information described later.

On the other hand, a depth map possessing unit 150 generates depth map data that represents the distribution of the depth information of objects, which can be used for the generation of a stereoscopic video stream. The depth map processing unit 150 generates depth map data using AF control information and the video information acquired from the camera unit 101, the decimal representation of 8 bit values, 255 to 0, the wide angle of view of the optical lens (e.g., corresponding to 28 mm lens equivalent of 35 mm film), according to the data obtained by processing of measured distance information under optical focus control and optical view-angle control (optical zoom) based on the meta-video discrimination of the subject object group at the time of shooting at a distance of 0.5 to 5 m in a state. The depth map data is generated by the method as described above.

The depth map processing unit 150 outputs the video depth map information among the generated depth map data, which corresponds to the stereoscopic display portion of the video, to the encode unit 130. The encode unit 130 encodes the video depth map information input from the depth map processing unit 150 as well as the clock information of the captured video (depth map video encode).

In addition, the depth map processing unit 150 detects a peak value and an average value of the depth map of every GOP (group of picture) according to the AF control information of the camera unit 101. Furthermore, the depth map processing unit 150 calculates a peak value and an average value of the depth map in one video chapter using the peak value and the average value of the depth map of every GOP. These values are used for the display control of the present embodiment. The depth map processing unit 150 outputs a peak value and an average value of the detected depth map as depth-map attribute information to a memory described later.

The various kinds of the encode information and the depth-map attribute information generated by the above processing are output to a RUV (Recording Unit of Video Object Unit) creation-record processing unit 140 and records various kinds of encode information and depth-map attribute information in AVCHD format. The storage 142 may be any of recording media including, for example, a flash memory card, an internal flash memory, a memory drive (e.g., SSD), a magnetic disk (e.g., a hard disk or a disc-shaped magnetic disk), and an optical disc (e.g., CD-RW (Compact Disc ReWritable), DVD (Digital Versatile Disc)–RW//+RW/RAM (Random Access Memory), or BD (Blu-Ray Disc (registered trademark)).

The AVCHD format is a recording format for recording an AV stream in which video data and audio information are multiplexed on a recordable recording medium. A video stream captured by a video camera or the like is encoded into an MPEG2-TS stream and recorded as a file in a recording medium when it is recorded in AVCHD format. Thus, this file is a stream management file. In general, the stream management file is constructed of four files; an index file, a movie object file, a movie play list file, and a clip-info file. The details of the AVCHD format will be described later.

As shown in FIG. 5, in the stereoscopic video stream, a RUV, a recording unit for recording on a recording medium, includes a plurality of GOPs. Each of the RUVs in the stereoscopic video stream can be successively recorded on the storage 142. The number of GOPs in the RUV is restricted by the recording unit of the recording medium. Each of the GOPs includes a main video GOP and a depth map video of the main video GOP. The main video GOP and the depth map video thereof are recorded with the completely identical time stamp. Furthermore, if the RUV is recorded on the storage 142, the recorded postscript logical address is provided as recording position information on the storage 142 and added to RUV. The recording position information is recorded on the EP_Map of the clip info file of the AVCHD stream management file.

The EP_Map is a table that corresponds to the logical address position of the EP (Entry Point) of the stream and the time stamp of the recorded content stream which are recorded on the recording medium. Here, the EP is a basic access unit to the recording medium in AVCHD format.

Furthermore, the stereoscopic video RUV of the present embodiment is provided with stereo attribute flags each indicating whether the recorded video stream is a stereoscopic video. The stereo attribute flag includes a first stereo attribute information representing whether a depth map mode is employed and a second stereo attribute information representing whether a left-and-right parallax image mode (binocular disparity mode). If there is one stream as in the case of the present embodiment, the first stereo attribute information becomes "TRUE" and the second stereo attribute information becomes "FALSE" when the stereoscopic video stream is recoded. Then, the stereo attribute flag is recorded on each of the AVCHD stream management file and a new extended definition field for modified DV pack 144 of the stream.

In addition, various kinds of the encode information and the depth-map attribute information are also recorded on a predetermined file 146 in the stream management file in AVCHD format. In the predetermined file 146 in the stream management file, for example, the stream attribute information of the AVCHD format recorded on the storage 142, the logic address position information corresponding to the time stamp are recorded. Furthermore, in the file 146 in the stream management file, various kinds of the stream attribute information corresponding to the time stamp in UI (User Interface) operation content index format are recorded.

(Configuration and Function of Reproduction/Output Processing Part of Image-Pickup/Recording Apparatus)

Furthermore, the image-pickup/recording apparatus 100 of the present embodiment includes a reproduction/output processing part that reproduces the recorded stereoscopic video stream. However, the reproduction/output processing part of the present invention is not a reproducing apparatus having a display control unit for controlling the display of a stereoscopic video stream and an overlay bitmap according a display control mode as described above but one regenerating only a stereoscopic video stream. As shown in FIG. 6, the reproduction/output processing part allows a RUV reproduction processing unit 160 to decode the encoded video stream, audio information, and video depth-map information from the stream management file in AVCHD format recorded on the storage 142 and then reproduce the decoded information.

The RUV reproduction processing unit 160 acquires the information recorded on the storage 142 and then outputs the information to an output processing unit 170. The output processing unit 170 decodes the encoded video stream, audio information, and video depth-map information (main video decode, an audio decode, and depth-map video decode).

In addition, the RUV reproduction processing unit 160 outputs a peak value and an average value of the depth map from the depth-map attribute information recorded in the new extended definition field of the modified DV pack 144 of the stream management file to the output processing unit 170. Furthermore, both the stereoscopic video stream and the clock information are also used in the process of writing an overlay bitmap at the time of disk-doubling in the output processing unit 170.

The output processing unit 170 outputs the decoded reproduced video stream to the video output control unit 182 and also outputs the decoded audio information to an audio output unit 184. The video output control unit 182 performs display-processing on the video stream and then outputs the processed video stream to a superimposed display processing unit 186 for character data information. The superimposed display processing unit 186 for character data information superimposes the clock information and the camera information as character information, which has been input from an addition processing unit 194 for depth map video level as described later, onto the video stream. The audio output unit 184 outputs audio information to a display 200.

Furthermore, the output processing unit 170 outputs the decoded video depth-map information to an adaptation processing unit 192 for depth map video level and also outputs the clock information and the camera information to an addition processing unit 194 for depth map video level. Various kinds of stream attribute information, which correspond to a time stamp in UI-operation content index format acquired from a predetermined file 146 of the stream management file, are also input to the adaptation processing unit 192 for depth map video level and the addition processing unit 194 for depth map video level. An addition processing unit 194 for depth map video level outputs the information subjected to the addition processing to each of the adaptation processing unit 192 for depth map video level and the superimposed display processing unit 186 for character data information. The adaptation processing unit 192 for depth map video level outputs the generated depth map video to the display 200 which is capable of displaying a stereoscopic display.

A video stream, audio information, and depth map video were inputted from the reproduction/output processing part of image-pickup/recording apparatus 100. The display 200 performs a process of reconstructing a video by a reconstruction processing unit 202 for parallax video. Therefore, the display 200 can reproduce and display the depth sensation of the stereoscopic video stream.

In the above description, the configuration of the image-pickup/recording apparatus 100 of the present embodiment has been described. This image-pickup/recording apparatus 100 can be connected to the reproducing apparatus of this embodiment. Thus, the reproduction/output processing part can display the stereoscopic video stream so that the stereoscopic video stream can be displayed on the display 200 connected to the image-pickup/recording apparatus 100. The reproducing apparatus of the present embodiment, which will be described below, includes a display control unit that carries out the display control of a stereoscopic video stream and an overlay bitmap based on the depth map generated by the image-pickup/recording apparatus 100. Hereinafter, the configuration of the reproducing apparatus provided with the display control unit of the present embodiment and the display control using such a unit will be described with reference to FIG. 7 to FIG. 11.

Figure 7:
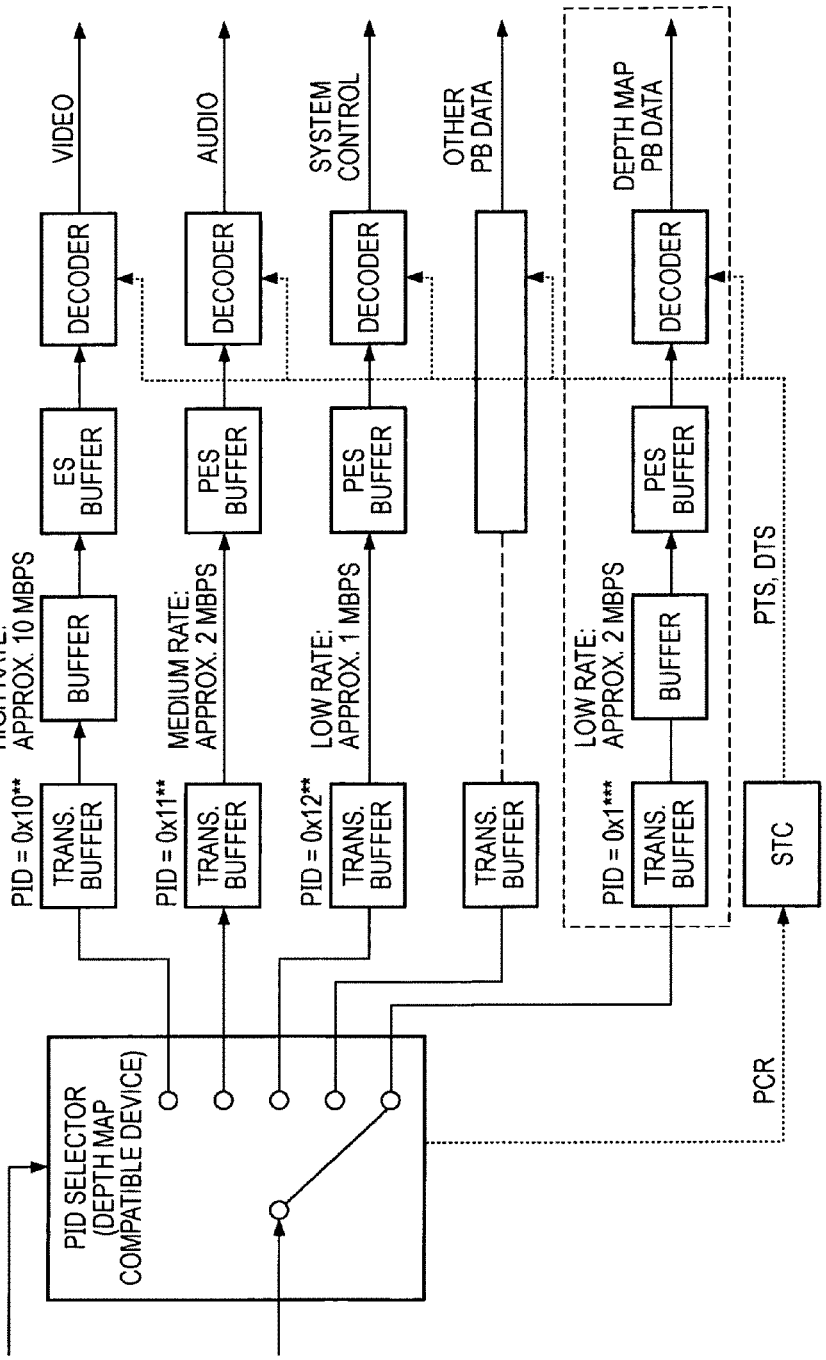
FIG. 7 is a block diagram illustrating the configuration of a typical reproducing apparatus which is capable of reproducing a stereoscopic vide stream.
Figure 8:
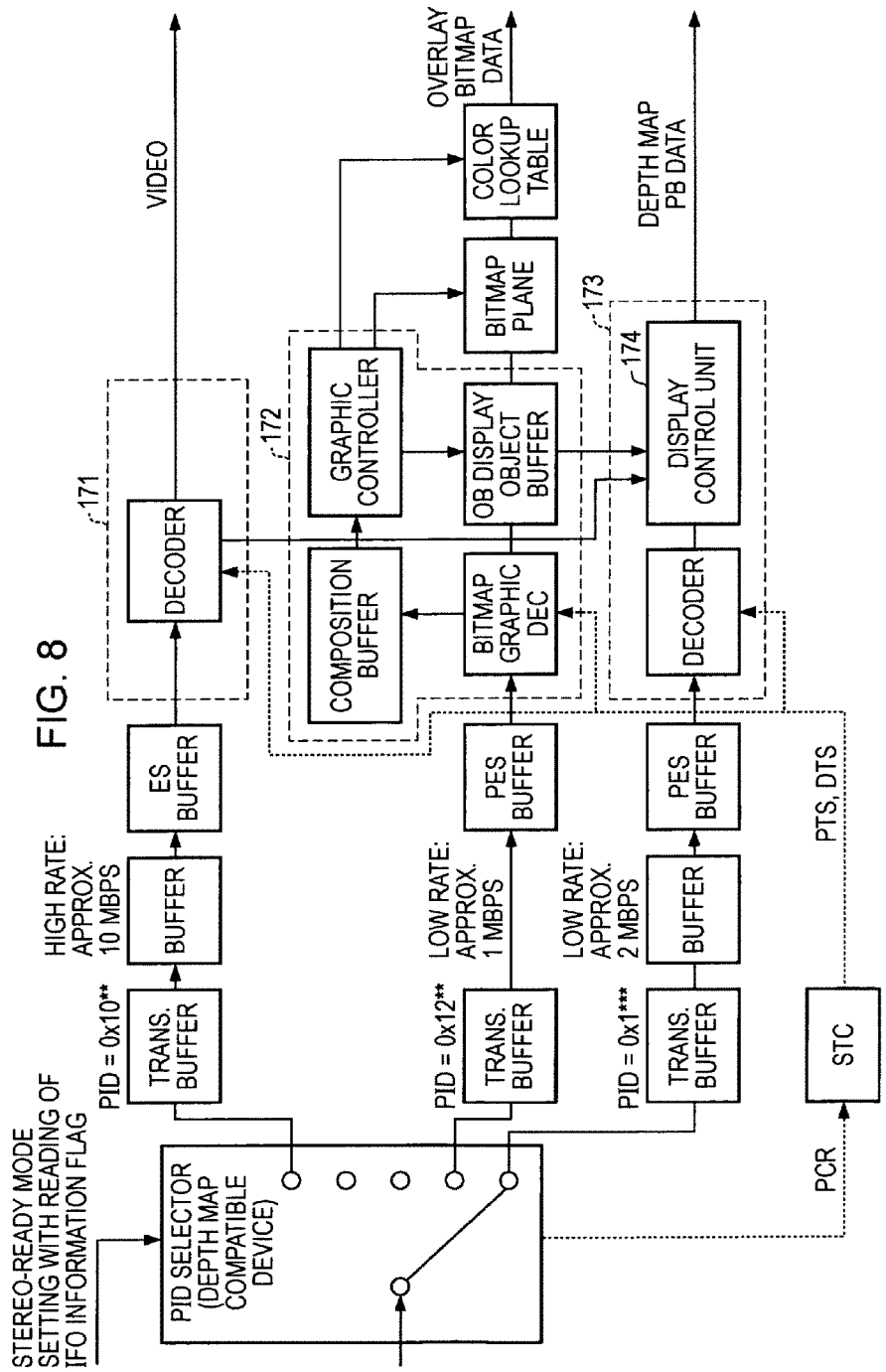
FIG. 8 is a block diagram illustrating the configuration of a reproducing apparatus with a display control unit according to the embodiment of the present invention.
Figure 9:
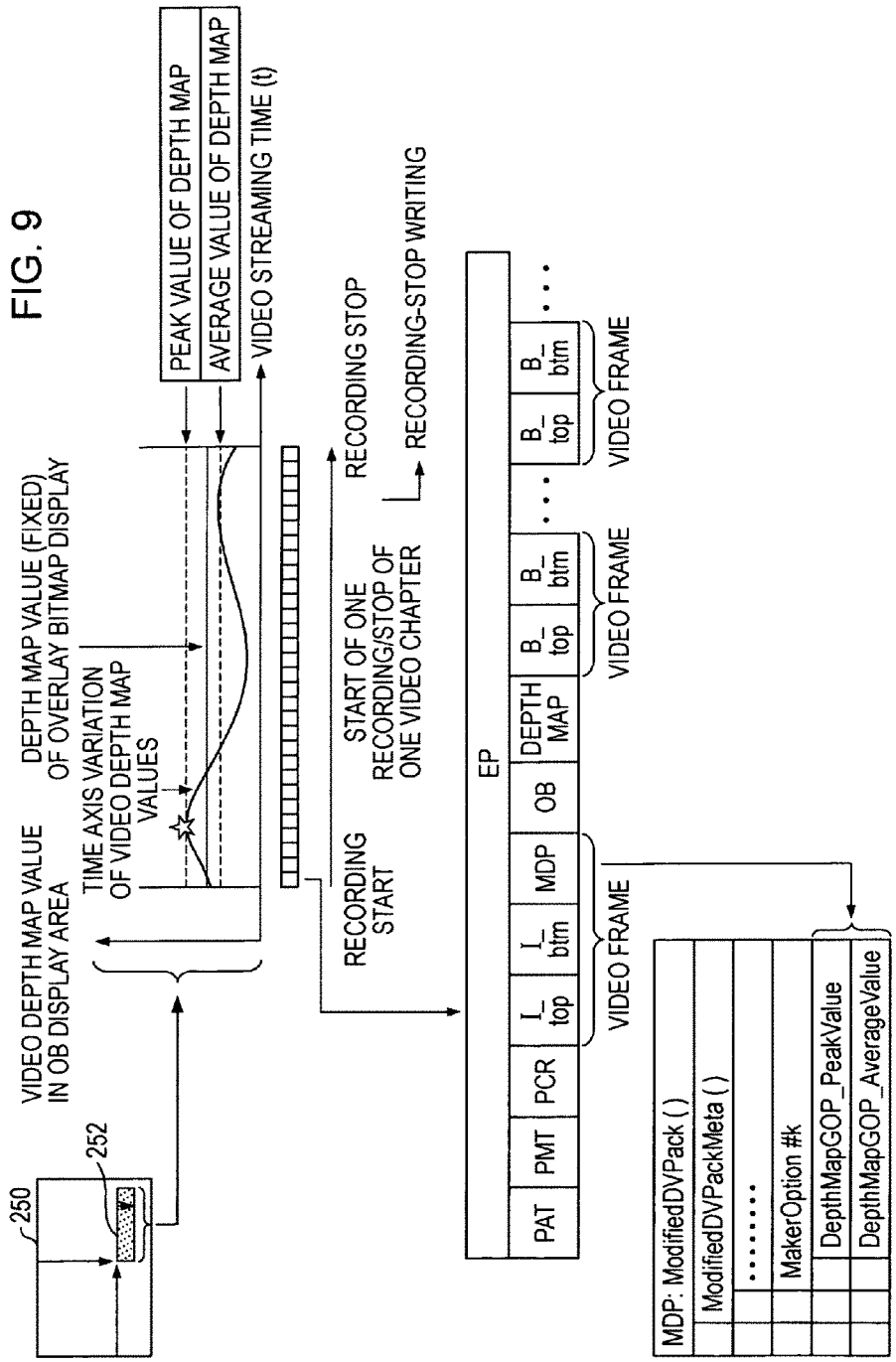
FIG. 9 is an explanatory diagram illustrating the configuration of information used for display control of the overlay bitmap of a stereoscopic video stream.
Figure 10:
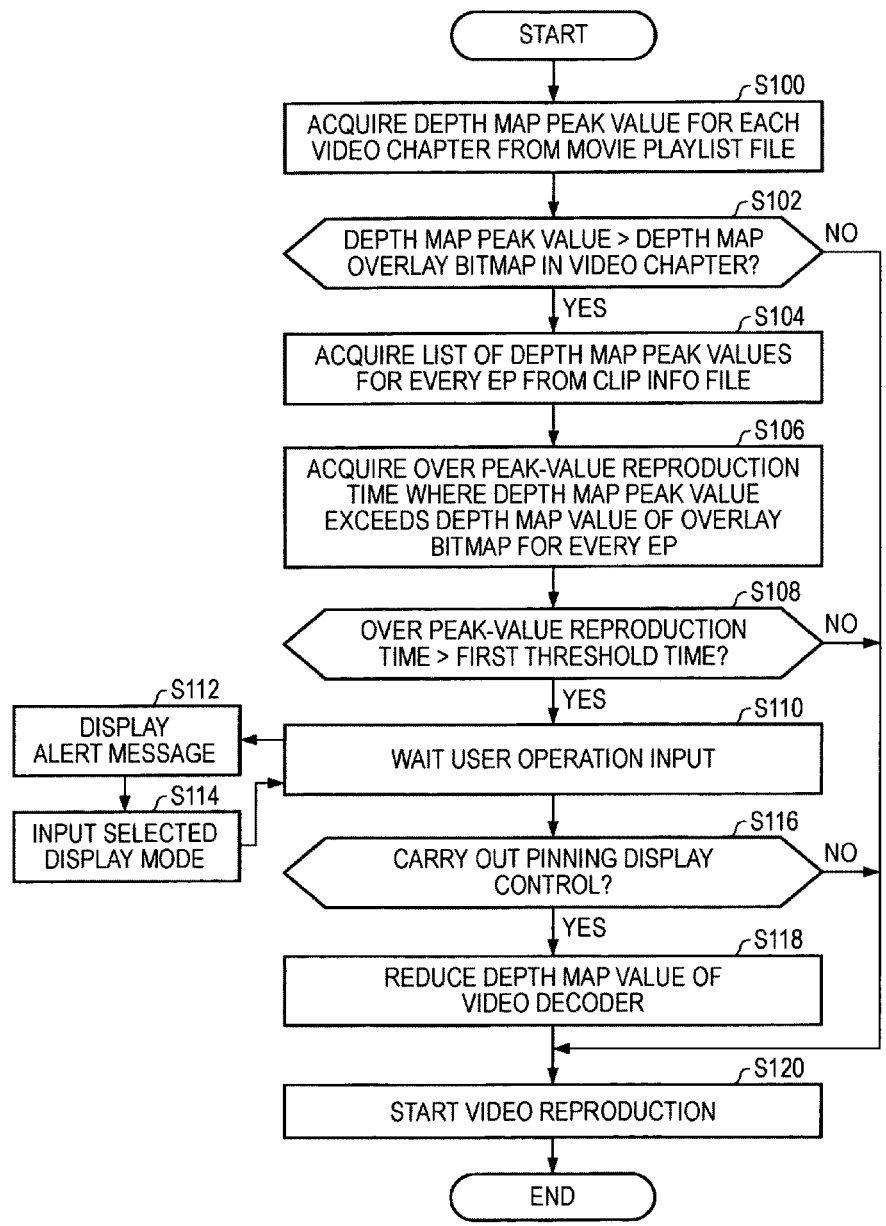
FIG. 10 is a flow chart illustrating a display control method at the time of a pinning display control mode performed by the display control unit of the present embodiment.
Figure 11:
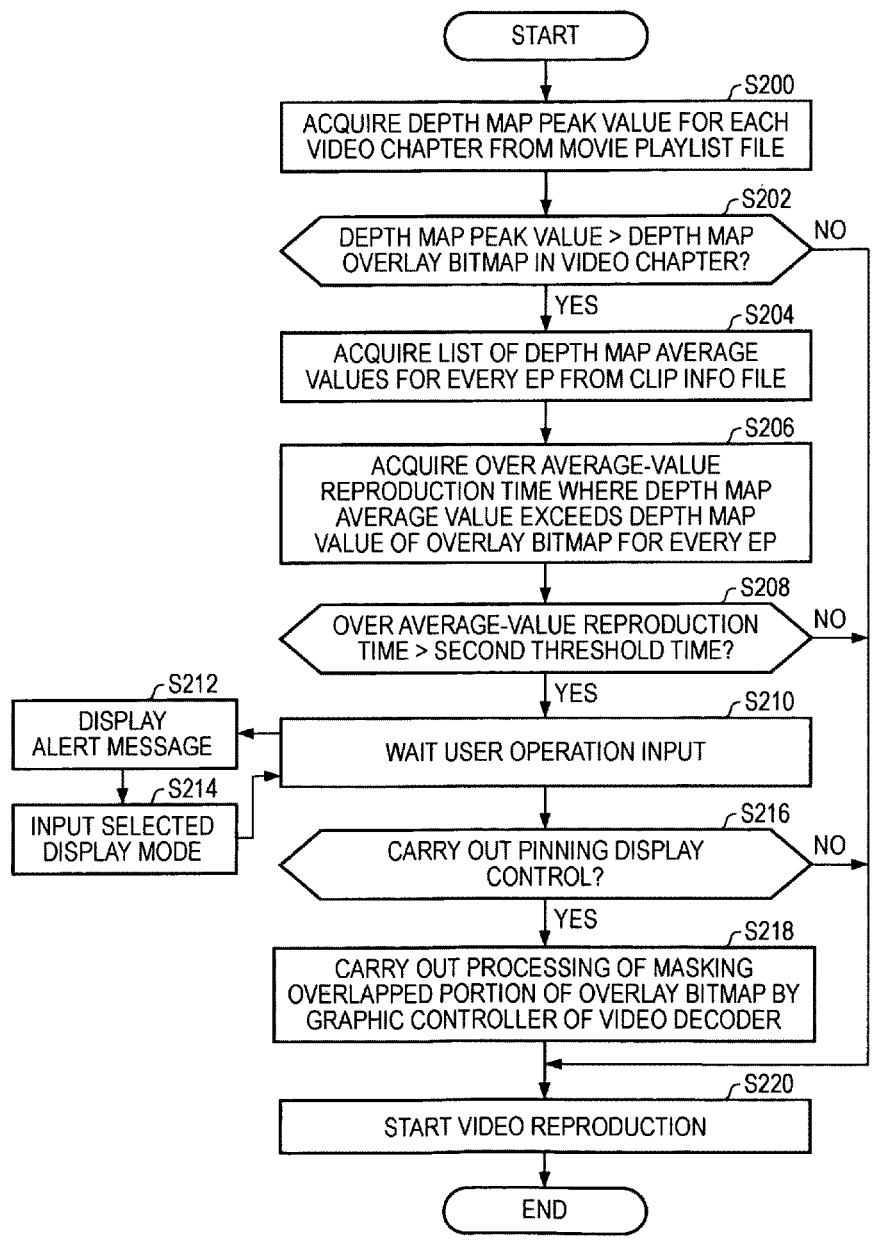
FIG. 11 is a flow chart illustrating a display control method at the time of an embedding display control mode performed by the display control unit of the present embodiment.

FIG. 7 is a block diagram illustrating the configuration of a typical reproducing apparatus which is capable of reproducing a stereoscopic vide stream. FIG. 8 is a block diagram illustrating the configuration of a reproducing apparatus with a display control unit according to the embodiment of the present invention. FIG. 9 is an explanatory diagram illustrating the configuration of information used for display control of the overlay bitmap of a stereoscopic video stream. FIG. 10 is a flow chart illustrating a display control method at the time of a pinning display control mode performed by the display control unit of the present embodiment. FIG. 11 is a flow chart illustrating a display control method at the time of an embedding display control mode performed by the display control unit of the present embodiment.

[Configuration of Reproducing Apparatus]

The reproducing apparatus shown in FIG. 7 includes a function of decoding a depth map in addition to the configuration of the typical reproducing apparatus for decoding a video stream, audio information, and so on. The reproducing apparatus reads a stereo attribute flag, which is recorded on the stream management file (IFO) in AVCHD format, from the read-out destination of a video stream. The PID selector of the reproducing apparatus performs a process of reproducing a two-dimensional video stream when the first stereo attribute information of the stereo attribute flag is "FALSE". On the other hand, when the first stereoscopic attribute information of the stereoscopic attribute flag is "TRUE", the PID selector performs a process of reproducing a stereoscopic video stream. The PID selector separates the depth map from other information based on PID which is given to each packet for every class in the read video stream. Therefore, an undesired depth-map data packet is prevented from being input to the video decoding side of the prior-art two dimensional flat view video. The downward compatibility of video stream reproduction can be held.

As shown in FIG. 7, PID is imparted to each of packets depending on the TS packet class when a video stream in TS stream (transport stream, hereinafter abbreviated as a TS stream) format is recorded, the reproducing apparatus separates packets into classes based on their respective PIDs by the PID selector. Thus, the PID selector separates each of the packets from the other based on the respective PIDs. After accumulating packets into a packet ES buffer, various kinds of information are decoded to output PB data, such as the video stream, audio information, and system control information, to the display. Likewise, the reproducing apparatus decodes the depth map stream divided by the PID selector and then outputs the decoded depth map stream to the display.

If the display is a stereoscopic video display device that receives a depth map stream as an input, the depth map stream can be output from the reproducing apparatus of the present embodiment. If the display is a stereoscopic video display device receives only two video streams with left-and-light parallax, a left-and-light parallax video is generated using the depth map information and then output to the stereoscopic video display device only having two video inputs for left-and-light parallax. In the present invention, the depth map stream simultaneously recorded at the time of shooting a video is held. Thus, even if a video stream shot by telephoto end zoom with a telephoto angle of view originally without any left-and-right parallax, a left-and-right parallax video can be produced from the depth map information and then output to the display just as in the case with a video stream shot by a wide-angle shot video stream at the wide end.

Furthermore, the reproducing apparatus takes out PCR, one of segments of a video stream, and then generates PTS (Presentation Time Stamp) and DTS (Decoding Time Stamp), which are time information for synchronized reproduction, from STC (System Time Clock). The PTS is a time stamp for reproduction/display time and described on the header of PES (Packetized Elementary Stream). The DTS is a time stamp for decode time and described on the header of PES. Both PTS and DTS are input into a decode section that decodes various kinds of information and then given to the various kinds of information after decoding. Both PTS and DTS are used for associating the video stream and the depth map video after decoding.

Referring now to FIG. 8, the configuration of the reproducing apparatus provided with a display control unit according to the present embodiment will be described in more detail. A display control unit 174 of the present embodiment is mounted on a depth-map video decode section 173 that decodes a depth map video. The display control unit 174 receives a video stream decoded by the main video decode section 171, an overlay bitmap decoded by the OB decode section 172, and a decoded depth map video. The display control unit 174 controls the display of a stereoscopic video stream and an overlay bitmap based on these kinds of information and the display control mode represented in FIG. 1 to FIG. 3.

A main video decode section 171 decodes a video stream and then outputs it to the display control unit 174. In addition, the depth-map video decode section 173 reads the information of the modified DV pack 144 every 1 EP (or GOP) unit, which is stored on the basis of the contents of the video stream at the time of shooting, to obtain depth-map attribute information that represents the peak value and the average value of the depth map. Furthermore, depth-map video decode section 173 outputs the acquired depth-map attribute information to the display control unit 174 that controls the display position of the depth map video.

An OB decode section 172 decodes the bitmap image data of the overlay bitmap data. The OB decode section 172 constitutes the decoded bitmap image data and determines where the bitmap image data is displayed on the display area 250 by a graphic controller. In this way, the OB decode section 172 provides the display control unit 174 with the position information of the overlay bitmap data when the display position of the overlay bitmap data within the display area 250 is recognized.

Furthermore, the graphic controller performs a process of outputting the position information of the overlay bitmap data as well as a process of determining the plane and color of the constituted bitmap image data. Furthermore, the segments of the overlay bitmap of each EP in the stereoscopic video stream include, as described above, a display configuration information definition (PCS), a color palette definition (PDS), a window video definition (WDS), a display object definition (ODS), and so on. The image of the overlay bitmap can be made using these kinds of information.

The display control unit 174 controls the display of a stereoscopic video stream and overlay bitmap using the above input information. Heretofore, before the description of the display control process by the display control unit 174, various kinds of information to be used for the display control process will be described.

As shown in FIG. 9, an OB display area 252 displaying the overlay bitmap can be defined in the display area 250 of the stereoscopic video stream. For example, when the additional information displayed as overlay bitmap data is caption and time of date, the OB display area 252 is defined on a fixed position, such as a right corner, a lower part, or an upper part of the display area 250. In the display control process of this embodiment, the position in the depth direction of overlay bitmap displayed on the OB display area 252 is being fixed in any of hide mode, pinning display mode, and embedding display mode. Thus, it can be superimposed and displayed in front of the stereoscopic video stream when the stereoscopic video display device is viewed from the viewer.

On the other hand, the depth map information fixes the displayed subject object of the stereoscopic video stream in hide mode in which the overlay bitmap. In each of the pinning display mode and embedding display mode, during the period of reproducing one video chapter, the peak value and the average value of the depth map stream of the video in the chapter of the depth map is registered when it is recorded on the stream management DB file. Thus, the depth information of the stereoscopic view can be reduced in proportion to a decrease in depth map information of the video on the whole screen at a certain fixed ratio. Therefore, the depth map processing unit 150 of the image-pickup/recording apparatus 100 shown in FIG. 4 detects the peak value and the average value of the depth map of the EP (GOP) unit in the OB display area 252 as the depth information of the stereoscopic video stream.

With reference to the configuration of the image-pickup/recording apparatus 100 shown in FIG. 4 as well as one shown in FIG. 9, the recording of depth map information of each video and the peak value thereof at the time of recording the stereoscopic video stream will be described in detail. One EP (GOP) includes a plurality of segments. The depth map processing unit 150 on the recording side shown in FIG. 4 records the peak value (DepthMap GOP_PeakValue) and the average value (DepthMap GOP_AverageValue) of the depth map of the EP (GOP) unit on the predetermined field of the stream management DB file. At the time of reproduction, these kinds of information are acquired in the preparatory stage of starting the reproduction and the peak depth map value in one specified reproduced chapter is then instantly acquired and judged, followed by subjecting the values of the depth map of the video stream to arithmetic processing to control the depth direction of the stereoscopic video display.

Separately, furthermore, the depth map processing unit 150 records the peak value and the average value of the depth map of the EP (GOP) unit in the MDP of each EP video frame. By recording in the stream in this way, even when the stream management DB file for managing access to the video stream is broken by any accident during the recording, storing in a medium, reproducing, or editing, the depth map attribute information of the EP (GOP) unit can be acquired, in spite of taking much time, by referencing the MD pack in the video stream. In other words, such a configuration can lead to read a stream within a recoverable range and recover the broken stream management DB file. In addition, the integrity of the attribute information can also be held as a video stream.

For one video chapter acquired and recorded on a medium by one recording start/stop operation, if it is necessary to restrict the display area within the OB display area 252 by each EP (GOP), the setting and control depending on such a demand may be performed within the OB display area 252.

Alternatively, if it is not necessary, the setting and control may be performed on the entire display area of the screen. In other words, in both cases, the setting and control for acquiring the peak value and the average value of the depth map values are set to the depth map processing unit 150 on the recording side in FIG. 4 to carry out the detection. When the video depth map value is acquired, as shown in FIG. 9, a time variation in video depth map value can be recognized. The video depth map value shown in FIG. 9 is the average value of the depth map in the OB display area 252 in each EP (GOP) unit. The depth map processing unit 150 makes the maximum video depth map value in one video chapter the peak value of the depth map in the video chapter concerned, and it also makes the average of video depth map values in one video chapter the average value of the depth map in the video chapter.

The peak value and the average value of the depth map of each video chapter detected by the depth map processing unit 150 is recorded as depth map attribute information on the play item of the extension data of the movie play list file in the stream management file. The depth-map attribute information is recorded in the stage of writing on the stream management file after stopping the recording of the video chapter.

[Display Control Process by Display Control Unit]

As described above, using the peak value and the average value of the depth map of each video chapter recorded at the time of shooting the video, the display control unit 174 controls the display of the stereoscopic video stream and the overlay bitmap at the time of reproduction. As shown in FIG. 1 to FIG. 3, the reproducing apparatus of the present embodiment can perform display control in any of three different modes: a hide mode in which a stereoscopic video mode is only displayed and an overlay bitmap is not displayed; a pinning display control mode; and an embedding display control mode. An appropriate mode can be previously selected from these modes at the time of shooting a video or authoring. The reproducing apparatus controls the display of a stereoscopic video stream and an overlay bitmap according to the previously determined display control mode.

(Display Control Process in Hide Mode)

First, if the display-control mode is set to the hide mode, the reproducing apparatus does not decode the overlay bitmap data which is not displayed. Therefore, the reproducing apparatus decodes a video stream, audio information, and system information, and outputs them to the display. At this time, the reproducing apparatus does not typically operate the display control unit 174 that performs the display control of the stereoscopic video stream and the overlay bitmap.

(Display Control Process in Pinning Display Control Mode)

Next, if the display control mode is set to the pinning display control mode, the display control process shown in FIG. 10 is carried out by the display control unit 174. First, the display control unit 174 acquires the peak value of the depth map of each video chapter from the movie play list file (step S100). Then, the display control unit 174 determines whether the peak value of the depth map exceeds the depth map value of the overlay bitmap (step S102).

The depth map value of the overlay bitmap is generally a fixed value. For example, if the depth at a distance of 0 to 5 m is represented in a video, the overlay bitmap is represented at a fixed position of 2 m in depth. In step S102, if it is determined that the peak value of the depth map does not exceed the depth map value of the overlay bitmap, then the reproducing apparatus begins to reproduce the stereoscopic video stream while it does not perform display control with the display control unit 174 (step S120). That is, the stereoscopic video stream is displayed while remaining in the state of being recorded at the time of shooting the video, and the overlay bitmap is displayed on the fixed display position of the OB display region 252.

On the other hand, in step S102, if it is determined that the peak value of the depth map exceeds the depth map value of the overlay bitmap, the reproducing apparatus acquires the peak value of the depth map of each EP (GOP) as a list from the clip info file (step S104). Then, an over peak-value reproduction time where the peak value of the depth map exceeds the depth map value of the overlay bitmap is acquired (step S106). An over peak-value reproduction time is acquired in the unit of EP (GOP) reproduction time.

The reproducing apparatus performs display control so that the user can easily watch and listen to a stereoscopic video stream. However, the peak in the state in which the value of the depth map for every EP (GOP) exceeds the depth map value of the overlay bitmap. The stereoscopic vision obtained by the depth map of the overlay bitmap, which is superimposed and displayed on the viewer's side on the front of the stereoscopic video stream, can cause display disturbance by stereoscopic representation with the depth map of the object of the stream screen. Therefore, the user may not visually recognize additional information, such as time of date, shooting information, and various kinds of information at the time of shooting.

Then, the display control unit 174 starts to reproduce the video in pinning display control mode. At this time, from a stream management DB file, the display control unit 174 first reads and confirms the peak-value registration data of the depth map in one-chapter section already registered in the designated field position of the file at the time of shooting the video. Such a process can be instantly completed. Then, if it is determined that the peak-value registration data of the depth map stream of the video stream hides at the stereoscopic display position on the screen, which is specified by the depth map that displays the additional information of the overlay bitmap, or in this case, the stereoscopic viewer is behind the object of the movie stream. The video stream is controlled so that the additional information of the overlay bitmap can be displayed in front of the object of the video stream to prevent the display of the overlay bitmap being hidden by the video stream.

In a particularly preferable embodiment, the adaptation processing unit 192 for depth map video level shown in FIG. 6 first acquires a depth map peak value, which is of a video stream from the start of one video picture to the end thereof when starting the reproduction, from the registration field of the stream management DB file. Then, the adaptation processing unit 192 for depth map video level determines a depth map reduction ratio which is provided for preventing the maximum peak value of the depth map during the reproduction of the chapter from exceeding the superimposed display depth map. Subsequently, the depth map value of the video stream being reproduced at such a constant is reduced at a predetermined ratio. Such a configuration may be set by the adaptation processing unit 192 for depth map video level, followed by starting the reproduction. The depth map stream value can be reduced at a constant reduction ratio which is not changed during the reproduction of one video chapter.

Here, the display control unit 174 determines whether the over peak-value reproduction time exceeds a first threshold time (step S108). The first threshold value time can be set up arbitrarily. Assuming that the object in the stereoscopic video stream is displayed in the OB display area 252 is displayed at the back of the display position of the overlay bitmap even in a short time where an excess of the peak value of the depth map in each EP (GOP), which is more than the depth map value of the overlay bitmap, is shorter than the first threshold time, the viewer can be prevented from watching and listening the stereoscopic video stream, the main contents of the display, on the contrary. Thus, if the display control unit 174 determines that the over peak-value reproduction time does not exceed the first threshold time, the stereoscopic stream is reproduced while remaining its state recorded at the time of shooting the video without changing the positions of the video stream and the overlay bitmap in the depth direction (step S120).

On the other hand, if it is determined that the over peak-value reproduction time exceeds the first threshold time on the other hand, the reproducing apparatus may be designed to output an instruction of displaying an alert message to the user to the display connected to the reproducing apparatus. Here, the "alert message" is a message for allowing the user to determine whether the pinning display control should be performed to visually recognize the additional information of the overlay bitmap.

At this time, the reproducing apparatus enters the waiting the user's input operation in response to the alert message (step S110). The display displays the alert message according to the instruction from the reproducing apparatus.

The user determines whether the pinning display control should be performed in response to the alert message displayed on the screen of the display and then inputs the determined result using an input device, such as a remote controller (not shown).

The determined result input by the user through the input device is entered as input information into the reproducing apparatus. The reproducing apparatus that has received the input information cancels the state of waiting the user's input operation and then determines whether the pinning display control based on the input information (step S116). If the user does not determine the execution of the pinning display control, the reproducing apparatus does not change the positions of the video stream and the overlay bitmap in the depth direction. Then, the reproducing apparatus reproduces the stereoscopic video stream while remaining its state recorded at the time of shooting the video (step S120). On the other hand, if the user determines the execution of the pinning display control, the display control unit 174 performs the pinning display control of the video stream (step S118).

As shown in FIG. 2, viewing from the viewer's side to the stereoscopic display apparatus, the execution of the pinning display control of the video stream allows the object of the video stream located at a position in the OB display area 252 to be typically displayed at the back of the position of the stereoscopic video display device of the OB display area 252 in the depth direction. The display control unit 174 shown in FIG. 8 determines the display position of the entire video screen including the object of the video stream in the depth direction of the stereoscopic video display device by arithmetic control of a decrease in depth map stream value, so that the depth map value of the object of the video stream in the OB display area 252 may be smaller than the depth map value of the defined overlay bitmap.

At this time, the depth map value of the object of the video stream after the change may be as follows: For example, the peak value of the depth map stream after the reduction process is smaller than the depth map value of the overlay bitmap. In other words, a reduction rate of the depth map stream value with respect to the reproduced/decoded depth map stream can serve as a fixed value so that the overlay bitmap can be displayed at the back of the stereoscopic display position in the depth direction from the start to the end of the reproduction of one video chapter. As described above, the display control unit 174 of FIG. 8 reproduces a stereoscopic video stream after setting the depth map value of the object of the video stream in the OB display area 252 to a reduced state with a predetermined ratio (step S120).

Furthermore, the graphic controller of the OB decode section 172 shown in FIG. 8 may change the contents of the overlay bitmap to be displayed.

For example, in the case of displaying the additional information, such as caption and time stamp, on the overlay bitmap, the transparency of the character background other than characters is increased to allow light to pass through so that the stereoscopic video stream behind can be distinctly seen. Therefore, the overlay bitmap can be displayed in preference to the stereoscopic video stream, while the background with a small amount of information can also represent the information of the stereoscopic video stream.

In the above description, the pinning display control of the video stream by the display control unit 174 has been described with reference to FIG. 8. By performing the process of the pinning display control, the overlay bitmap data can be prevented from being hidden behind the object of the video stream. Therefore, the additional information can be represented intelligibly for the user who watches and listens to the stereoscopic video stream.

(Display Control Process in Embedding Display Control Mode)

Next, if the display control mode is set to the embedding display control mode, the display control process shown in FIG. 11 is carried out by the display control unit 174. First, the display control unit 174 shown in FIG. 8 acquires the peak value of the depth map of each video chapter from the movie play list file (step S200). Then, the display control unit 174 determines whether the peak value of the depth map exceeds the depth map value of the overlay bitmap (step S202). If the peak value of the depth map does not ever exceed the depth map value of the overlay bitmap in one video chapter, the embedding display control may not be carried out.

The depth map value of the overlay bitmap is generally a fixed value. In step S202, if it is determined that the peak value of the depth map does not exceed the depth map value of the overlay bitmap, then the reproducing apparatus begins to reproduce the stereoscopic video stream while it does not perform display control with the display control unit 174 shown in FIG. 8 (step S220). The procedures in these steps are the same as those in steps S100 and S102 for the pinning display control mode shown in FIG. 10.

On the other hand, in step S202, if it is determined that the peak value of the depth map exceeds the depth map value of the overlay bitmap, the reproducing apparatus acquires the average value of the depth map of each EP (GOP) as a list from the clip info file (step S204). Then, an over average-value reproduction time where the average value of the depth map exceeds the depth map value of the overlay bitmap is acquired for every EP (GOP) (step S206). An over average-value reproduction time is acquired in the unit of EP (GOP) reproduction time.

The reproducing apparatus performs display control so that the user can easily watch and listen to a stereoscopic video stream. The overlay bitmap is generally displayed at the fixed position. Usually the display position of the object of the video stream is changed with the passage of time. For this reason, at the time of reproducing the video chapter, the object of the video stream is displayed in front of or at the back of the overlay bitmap according to circumstances. Thus, the user may or may not view and recognize the additional information of the overlay bitmap in one video chapter according to circumstances, causing difficulty in viewing and listening the stereoscopic video stream. The display control unit 174 shown in FIG. 8 performs the control of processing an image to be displayed so that the superimposed position between the portion of the OB display area 252 and the object of the video stream with respect to the overlay bitmap to be superimposed with the object of the video stream in the embedding display control mode.

Here, particularly, in the embedding mode in which the overlay bitmap display mode is selected, if the time period for hiding the display contents of the overlay bitmap is comparatively longer using the set values sensuously defined by the human viewer who is reproducing one video chapter, a time period where the viewer may not view and recognize the additional information of the overlay bitmap may increase when the over bitmap is displayed while being embedded in the object in the stereoscopic video stream. An increase in time period where the additional information of the overlay bitmap may not be visually recognized occurs. In this case, even though the selected display mode is one for displaying the overlay bitmap, the additional information displayed on the overlay bitmap is not sufficiently recognized by the viewer who watches the stereoscopic video display device.

Therefore, when starting the reproduction of the specified video chapter, the display control unit 174 shown in FIG. 8 may first confirm that the peak value of the depth map in the video chapter section corresponding to the reproduced video stream exceeds the depth map value of the overlay bitmap display and then confirm that the peak value of the depth map stream of the video stream exceeds the depth map value of the overlay bitmap display. The display control unit 174 is desired to determine whether the reproduction is carried out in pinning display mode when it is determined that an over-reproduction time (where the average of the depth map stream of the video stream exceeds the depth map value of the overlay bitmap display) exceeds a second threshold time. Here, the "second threshold time" is a time defined by a ratio of video reproduction time whether the viewer sensuously accepts a time period in which the display information of the overlay bitmap may not be viewed due to the display-hiding processing because the depth map value assigned to the overlay bitmap display exceeds the depth map stream belonged to the object group of the video stream.

Here, the display control unit 174 shown in FIG. 8 determines whether the over average-value reproduction time exceeds the second threshold time (step S208). The second threshold value time can be set up arbitrarily.

In a manner similar to the pinning display control mode, if a time period where the average value of the depth map in each EP (GOP) exceeds the depth map value of the overlay bitmap is slightly smaller than the second threshold time in a significant manner, the additional information of the overlay bitmap can be sufficiently recognized by the viewer because a time period in which the additional information may not be visually recognized does not disturb the viewing and listening of the viewer even if the overlay bitmap is embedded in the object in the stereoscopic video stream. Thus, if the display control unit 174 determines that the over average-value reproduction time does not exceed the second threshold time, the stereoscopic stream is reproduced while remaining its state recorded at the time of shooting the video without changing the positions of the video stream and the overlay bitmap in the depth direction (step S220).

On the other hand, if it is significantly longer time, the additional information may not be sufficiently recognized by the viewer because a time period in which the additional information may not be visually recognized increases when the overlay bitmap is embedded in the object in the stereoscopic video stream. Thus, if the display control unit 171 shown in FIG. 8 determines that the over average-value reproduction time exceeds the second threshold time, the display contents of the overlay bitmap can be prevented from being viewed and listened even though the embedding mode, one of the overlay-bitmap display modes, is selected. Thus, it is preferable to make the user confirm whether the reproduction of the overlay-bitmap display control may be started in embedding mode without modification. Hereinafter, the flow of such procedures will be described.

If it is determined that the over average-value reproduction time exceeds the second threshold time, the reproducing apparatus outputs an instruction of allowing the display to display an alert message to the user. The alert message may be one allowing the user to determine whether the embedding display control should be carried out. At this time, the reproducing apparatus enters the waiting the user's input operation in response to the alert message (step S210). The display displays the alert message according to the instruction from the reproducing apparatus. The user determines whether the embedding display control should be performed in response to the alert message displayed on the screen of the display and then inputs the determined result using an input device (not shown).

The determined result input by the user through the input device is entered as input information into the reproducing apparatus. The reproducing apparatus that has received the input information cancels the state of waiting the user's input operation and then determines whether the embedding display control based on the input information (step S216). If the user does not determine the execution of the embedding display control, the reproducing apparatus reproduces the stereoscopic stream while remaining its state recorded at the time of shooting the video without changing the positions of the video stream and the overlay bitmap in the depth direction (step S220). On the other hand, if the user determines the execution of the embedding display control, the display control unit 174 performs the embedding display control of the overlay bitmap on the object of the stereoscopic video stream (step S218).

If the embedding display control of the overlay bitmap is performed, the display control unit 174 allows the graphic controller of the OB decode section 172 to perform image processing on the overlay bitmap. The graphic controller performs negative-image processing on the superimposed portion between the overlay bitmap and the object of the video stream to hide the overlay bitmap superimposed with the object of the video stream. Therefore, as shown in FIG. 3, the overlay bitmap can be displayed while being embedded in the object of the video stream in the OB display area 252.

In the above description, the embedding display control mode has been described. Alternatively, the alert message in the step S212 may be one that allows the user to determine whether the display control is performed using the pinning display control mode or the embedding display control mode. In this case, the user may select the display control mode to be executed in response to the alert message displayed on the display and the selected result is then input using an input device (not shown).

The reproducing apparatus that has received the input information cancels the state of waiting the user's input operation and then determines a display control mode based on the input information (step S216). If the user selects the execution of the embedding display control, like the above description, the display control unit executes the embedding display control of the overlay bitmap (step S218).

On the other hand, if the user selects the pinning display control mode, the display control unit 174 performs the pinning display control of the video stream as described above.

In each of the pinning display control mode and embedding display control mode which have been described above, the alert message is displayed to allow the user to determine whether the process of display control is executed to select the mode appropriate for user's viewing and listening. However, the alert message may be not typically displayed. In this case, the display control process is performed in pinning display control mode when the over peak-value reproduction time exceeds the first threshold (S108) or in embedding display control mode when the over average-value reproduction time exceeds the second threshold time (S208).

In the above description, the display control process by the display control unit 174 of the present embodiment has been described. The reproducing apparatus of the present embodiment can provide a stereoscopic video stream appropriate for user's viewing and listening, which can be easily viewed and listened by the user by processing the display of an overlay bitmap and a video stream in response to the selected display control mode while considering the contents of the video stream.

[Recording of Stereoscopic Video Stream on AVCHD Stream Management File]

Now, a method of recording a stereoscopic video stream on an AVCHD stream management file in accordance with the present embodiment will be described. A stereoscopic video stream is recorded on a stream management file in AVCHD format by recording or authoring at the time of shooting a video.

The steam management file includes four files; an index file, a movie object file, a movie play list file, and a clip info file. The index file is a file for managing records of video chapters. In the present embodiment, the index file manages stereoscopic attribute flags for identifying stereoscopic streams. The movie object file is a file defined by an application recording format, managing records of video chapters. The movie play list file is a file that manages access to the video chapter for each content in the unit of recording and in-point/out-point logical time designation. The clip info file is a file that manages an access to an internal stream in the stereoscopic video chapter.

Figure 12:
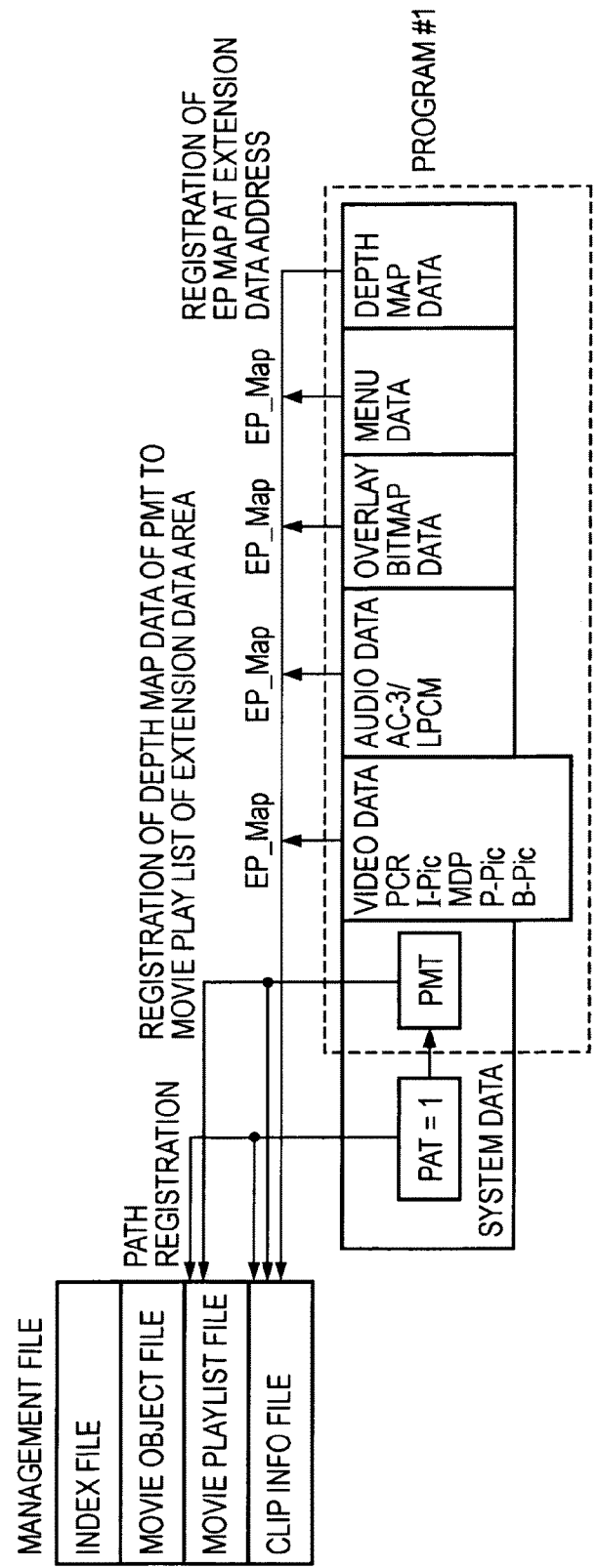
FIG. 12 illustrates a method of recording on a stream management file, which is employed when one stream is recorded thereon.

The system data about a stereoscopic video stream is recorded on such a stream management file. FIG. 12 illustrates a method of recording on a stream management file, which is employed when one stream is recorded thereon.

In other words, the method is employed when the first stereo attribute information of the stereo attribute flag recorded on the stream management file is "TRUE" and the second stereoscopic attribute information is "FALSE". As shown in FIG. 12, PAT (Program Association Table) and PMT (Program Map Table) are recorded on the movie play list file. The PMT is recorded on the extended definition field of the depth map data of the movie play list file. In this embodiment, the number of streams to be recorded is one (1), so that the PAT is "1". Furthermore, the PMT serves as a characteristic value that specifies each stream recorded on the movie play list file.

Furthermore, on the clip info file, in addition to the PAT and the PMT recorded on the movie play list file, video data, audio information, overlay bitmap data, menu data, and depth map data of the stereoscopic video stream are recorded.

The video data includes PCR (Program Clock Reference), I-Picture, MDP (Modified DV Pack), P-Picture, B-Picture, and so on. The audio data includes information of AC-3, LPCM, and so on. These kinds of information are registered in the EP_Map of the extended definition field of the clip info file.

Figure 13:
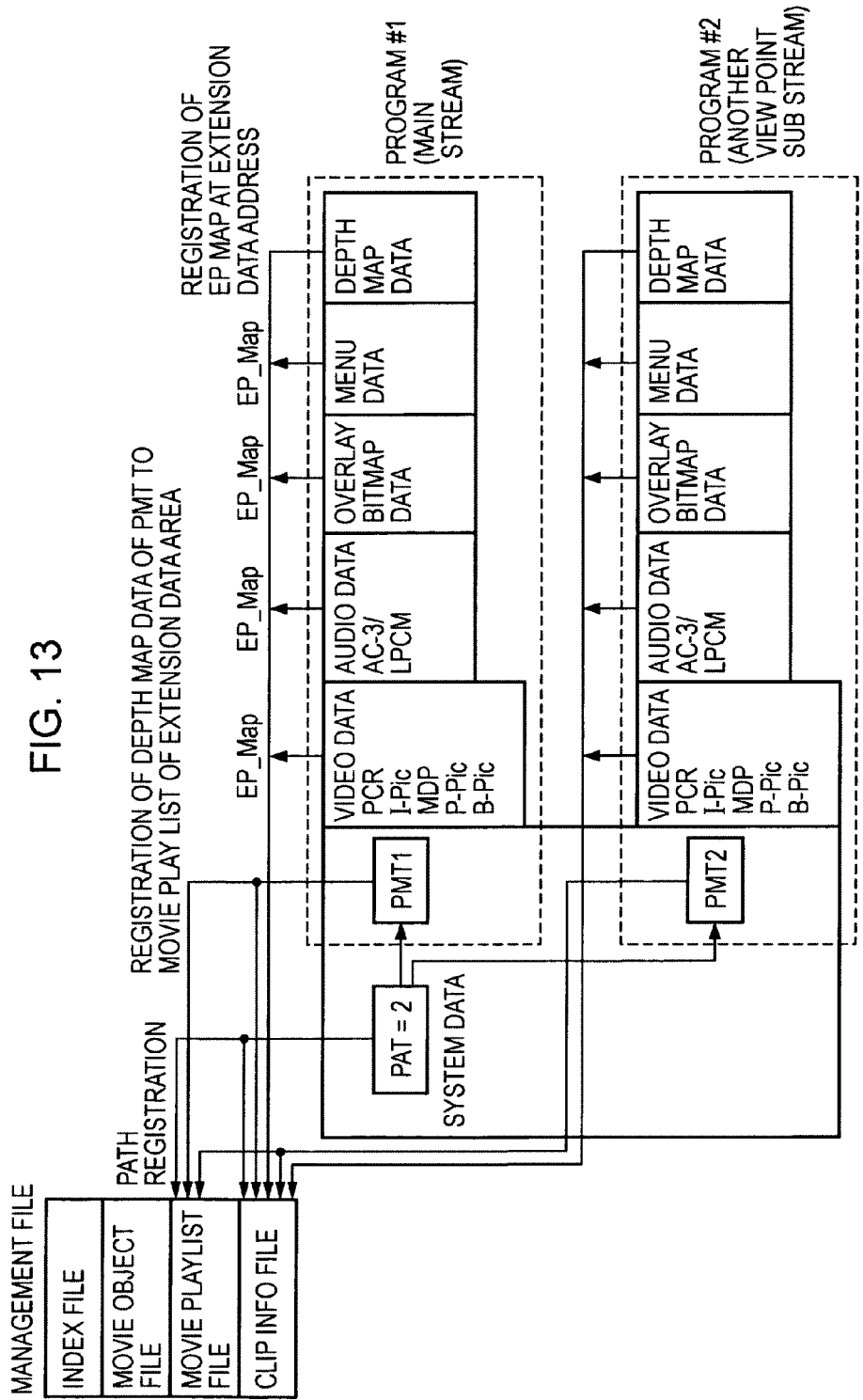
FIG. 13 illustrates a method of recording on a stream management file, which is employed when one stream is recorded thereon.

FIG. 13 is a diagram illustrating a method of recording on a stream management file when corresponding to a stereoscopic video stream with multiple viewing points. The stream management file shown in FIG. 13 stores two streams. In other words, the method is employed when both the first stereo attribute information and the second stereoscopic attribute information of the stereo attribute flag recorded on the stream management file are "TRUE".

Also in this case, PAT and PMT are recorded on the movie play list file. In addition, PAT, PMT, video data, audio information, overlay bitmap data, menu data, and depth map data of the stereoscopic video stream are recorded on the clip info file. In this embodiment, the number of streams to be recorded is two (2), so that the PAT is "2". Furthermore, the video data, audio information, overlay bitmap data, menu data, and depth map data of the stereoscopic video stream are recorded on each of the main stream and the sub stream.

In the above description, the configuration of the image-pickup/recording apparatus 100, the configuration of the reproducing apparatus that reproduces the recorded stereoscopic video stream, and the display control method have been described in accordance with the first embodiment of the present invention.

According to the present embodiment, when the TS stream recorded in stereoscopic mode at the time of shooting by the image-pickup/recording apparatus 100 is output in authoring system by the reproducing device of the present embodiment, the display of the video stream and the overlay bitmap is controlled based on the depth map data of the object of the video stream and the depth map value of the overlay bitmap.

Thus, in consideration of the contents of the movie stream, the display of the movie stream and the overlay bitmap are controlled.

In the present embodiment, the reproducing apparatus of the present embodiment can perform display control in any of three different modes: a hide mode; a pinning display control mode; and an embedding display control mode for the overlay bitmap so as to be appropriate for user's viewing and listening. Therefore, it is possible to prevent the display state from being frequently changed because the overlay bitmap is hidden behind the object of the image street and the overlay bitmap is visible or hidden behind the object of the video stream.

In addition, the recording/reproducing apparatus 100 of this embodiment carries out the extended definition of the AVCHD format and makes a stereoscopic video stream to be stored in a medium. The extended definition of the AVCHD format is applied to the configuration of the stereoscopic video stream so that an appropriate distance position of the depth map is defined to stereoscopically display the overlay bitmap. Then, the resulting stereoscopic video stream may be stored in any of storage media. Consequently, the stereoscopic video stream recorded in AVCHD format can be displayed without a sense of discomfort.

2. Second Embodiment

Figure 14:
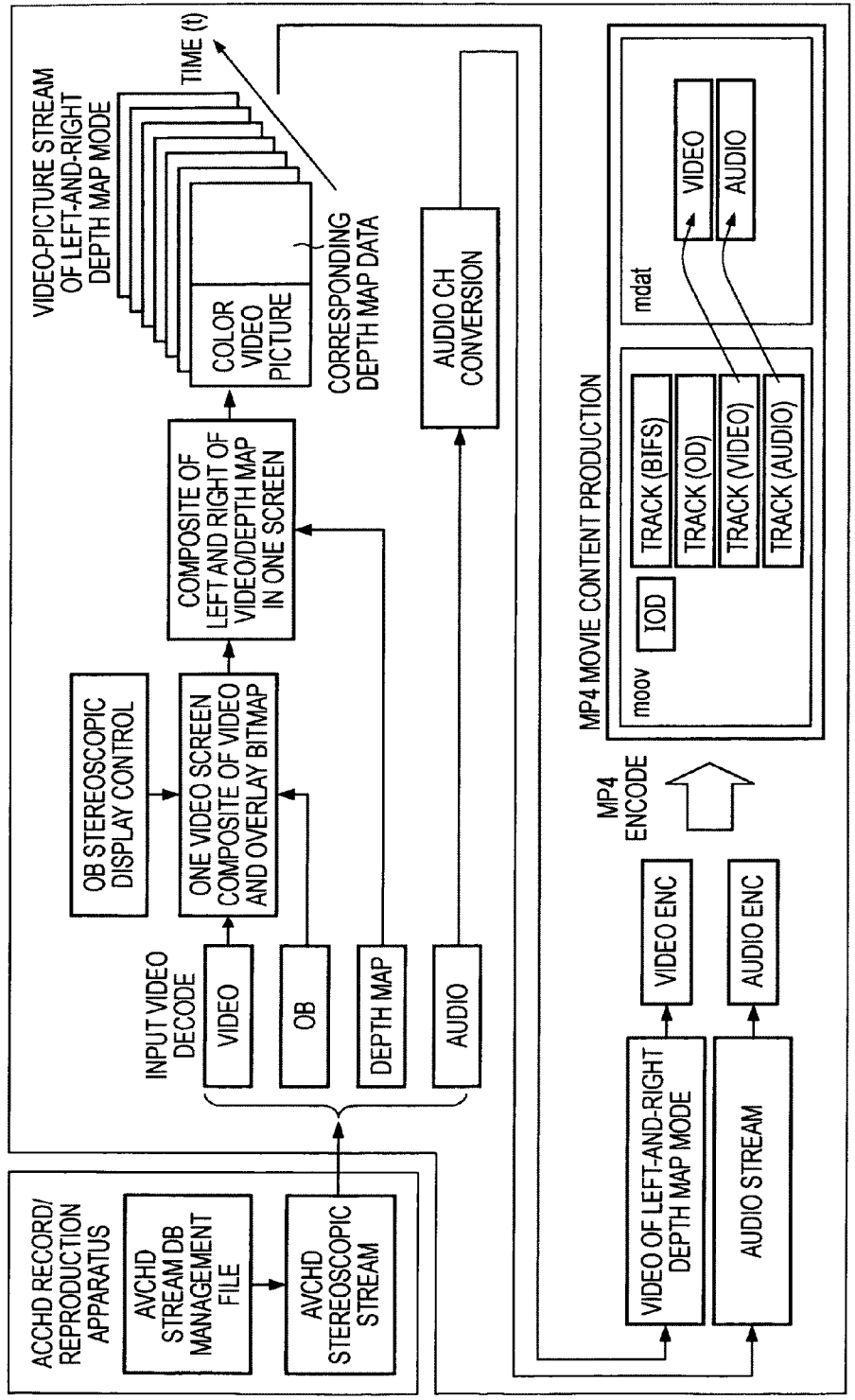
FIG. 14 illustrates a process of converting a stereoscopic video stream and an overlay bitmap into a MP4-format stereoscopic stream according to the second embodiment of the present invention.

Referring now to FIG. 14, a stereoscopic video stream and a process of converting an overlay bitmap into an MP4 stereoscopic stream according to a second embodiment of the present invention, which is an extended modification of the first embodiment, will be described. FIG. 14 is an explanatory diagram illustrating a stereoscopic video stream and a process of converting an overlay bitmap into an MP4 stereoscopic stream according to the second embodiment.

Specifically, FIG. 14 illustrates a case in which a depth-map-corresponding video (MPEG-C part 3 standard) of a P4 camcorder is converted into a stereoscopic video stream in AVCD format.

[Conversion of Stereoscopic Video Stream and MP4 Stream Recorded in AVCHD Format]

In recent years, various technologies for format conversion of videos into optical-disc video application formats, for example from MP4 to DVD, AVCHD, or Blu-Ray (registered trademark) have been developed. MP4 is one of file formats for storing compressed video data in MPEG-4 format prescribed in ISO/IEC 14496 standard. However, from now on, possible technologies will include the conversion of a video captured by an MP4 camcorder into a video stream recorded in AVCHD format, where the converted video can be stored in a recording medium, and the conversion of a depth-map-corresponding video stream captured by a high-quality AVCHD camcorder into a MP4 stream which can be stored in a recording medium.

Therefore, the following description of the present embodiment will be applicable to the conversion of a depth-map-corresponding MPEG-C part 3 video into a depth-map type AVCHD stereoscopic video stream which can be stored in a recording medium, such as a disc or the conversion of a depth-map-corresponding stereoscopic video stream captured by a high-quality AVCHD camcorder into an MP4 stream (MPEG-C part 3) of an MP4 camcorder.

An MP4 camcorder can be defined as one that captures an MP4 video stream subjected to image processing so that a frame is horizontally divided to arrange a color picture on the left side of the screen and a monochrome picture representing a depth map on the right side thereof. In this case, the conversion of MP4 into AVCHD or the conversion of AVCHD into MP4 is carried out by a converter in a cradle dedicated for each camcorder. The horizontally divided input video stream is separated into color pictures and depth map pictures every 30 frames per second. Then, the screen of each picture is horizontally elongated. Here, a super-resolving technology that complements insufficient horizontal resolution by motion vectors or the like. If the screen is horizontally elongated, then the color picture and the depth map picture are provided with the bit numbers of the corresponding horizontal resolution, followed by being accumulated in video buffer and depth map buffer, respectively.

When encoding the color pictures and depth map pictures accumulated in the video buffer and depth map buffer, an MP4 stream having roughly classified two files is processed as follows: Video management signals, such as PPS and SPS, defined in MP4 application format are embedded in an AVCHD stream, a packet identifier (PID) is placed in the stream, and then the stream is encoded. Re-MUX (Demux/Mux), called "smart rendering", may be performed to prevent image degradation due to a re-encoding process from occurring.

In addition, shooting time-stamp data is acquired from the MP4 management information and then embedded in the AVCHD stream.

To covert a stereoscopic video stream in depth map format captured by the high-quality AVCHD system into an MP4 video stream and record the converted stream into a recording medium, video data, audio data, and depth-map data are extracted using PDI and then decoded, followed by encoding to MP4 on an ES level. In MP4, a format type for retaining a depth map as another data in a stereoscopic video is not determined. Thus, an output with a screen divided into video/depth map instructed by MPEG-C part 3 is encoded into one screen. Obviously, like the present format, MP4 may be ado defined as a format in which a stereoscopic video stream retains depth map data as independent media data. In addition, if both MP4 and AVCHD formats have compatibility with an H.264/AVC video stream compression format, re-MUX dubbing in smart-rendering without re-encoding can be attained.

Here, the meaning of "both MP4 and AVCHD formats have compatibility with an H.264/AVC video stream compression format" will be explained as follows: MP4 mainly progresses the applications of network distribution contents. From the circumstances, the configuration of an MP4 stream is designed so that video-extension decoding of a compressed video stream does not fail in short intermittent defects in communication environment or does not fail in breakage of video-extension decoding process of the compressed video stream. Specifically, the MP4 stream is designed so that I-picture with I-picture frame characteristics from which a video stream can be newly started are inserted every one or two seconds, resulting in the stream sustainable to a breakdown in stream decode (hereinafter, referred to as an "Instantaneous Decoder Refresh (IDR)" frames). The "IDR" frames are appreciated. However, in the typical H.264/AVC format video compression stream in video application format compatible to AVCHD and Blu-Ray Disc (registered trademark) to be stored in the typical Blu-Ray Disc (registered trademark), the IDR frame is only inserted almost once every 10 seconds to realize higher image quality and more efficient compression at the same data transmission bit rate.

The present embodiment will be described with reference to examples in which MP4, AVCHD, and Blu-Ray (registered trademark) are used as application formats. Here, for the convenience of the user, smart rendering is desirable rather than dubbing of a captured stereoscopic video with a real reproduction time because it allows the user to perform dubbing only with packet-data dubbing processing shorter than a real reproduction time. The term "smart rendering" is a format that performs only de-multiplex or multiplex of TS stream packets while the compression state of the stream remains as it is, while any reproduction decoding or encoding of the video is not recorded. For realizing the smart rendering with the H.264/AVC video compression format, the following prerequisites are based on that a regenerating system device compatible with both application formats, MP4 and AVCDHD, may additionally deal with the H.264/AVC format and then records and reproduces the video in such format. It is considered that MP4 in the IDR insertion section is comparable with the IDR in both application formats, AVCHD and Blu-Ray (registered trademark).

Here, the term "IDR" refers to one of MPEG video compression systems, where one frame in H.264/AVC format is a single picture on the screen, which is one of pictures included in a video stream. Here, P-picture and B-picture are difference video ingredients in comparison with I-picture along the time axis. The I-picture is a compressed video in one screen space. The term "time scale compression" means that one picture is replaced with a reference difference picture with another picture. Both the P-picture and the B-picture have their own reference relationships; the P-picture refers to a picture temporally earlier than the p-picture itself and the B-picture refers to pictures temporally earlier and later than the B-picture itself. Each of the P- and B-pictures except for the I-picture has its own picture served as an original of the reference relationship. The inter-frame dependency is referred to as a "reference" and a group of pictures including the I-picture and pictures which refer to and depend on the video difference is correctively referred to as GOP (Group of Pictures).

The IDR (Instantaneous Decoder Refresh) frame is one newly added by one of the MPEG compression standards, an H.264/AVC image compression standard, and particularly it can be functioned and identified as an I-frame reproducible from the frame.

In the H.264/AVC format, a plurality of references, multiple references (multiple reference pictures), is newly introduced and used to improve a time-base compression rate.

For example, the P-frame refers to not only the immediately precedent I-frame but also other previous I-frames in time scale. Such a newly defined format leads to an improvement in compression efficiency while retaining a high image quality and is applicable to a HD video compression with high image quality. Thus, the newly defined format can be widely used as a compression stream format in video shooting, recording, and video contents.

However, if any reference relationship is made on very early frames in time scale the relation of multiple references, when a video stream is broken off by abnormal communications or cut by editing work, a time period in which all the subsequent stream portions that follow are affected and hardly decoded may be extended. In addition, the amount of data for reference relationship may be also increased. For this reason, it is desirable to break the reference relationship between multiple references within an appropriate predetermined time axis range. Thus, an I-picture having a flag for breaking the multiple references is referred to as "IDR" to discriminate from others.

In the process of converting a video stream in a MP4-format recording/reproducing apparatus into a video stream into an AVCHD-format recording/reproducing apparatus, MP4 clock information is acquired and an overlay bitmap is then generated. Subsequently, the overlay bitmap is provided with a depth map value and then stationary arranged on a predetermined stereoscopic position of the stereoscopic image.

In the above description, the process of converting a stereoscopic video stream and an overlay bitmap into a MP4-format stereoscopic stream according to the second embodiment of the present invention has been described. As described above, it is also possible to convert a stereoscopic video stream recorded in AVCHD format into an MP4-format stream or vice versa. If the stereoscopic video stream recorded in AVCHD format is of the recording mode described in the first embodiment, the stereoscopic video stream and the overlay bitmap can be displayed under controls in response to the aforementioned display control mode when it is reproduced by a reproducing apparatus provided with a display control unit.

Preferred embodiments have been described in detail with reference to the attached drawings. However, the present invention is not limited to these embodiments. A person skilled in the art will be easily recognized that various modifications and improvements can be easy attained within the technical ideas described in claims and naturally recognized that these modifications and improvements will belong to the technical scope of the present invention.

For example, in the above embodiment, the video recorded by the image-pickup/recording apparatus is designed to carry out display control of a stereoscopic video stream and an overlay bitmap using a reproducing device having a display control unit. However, the present invention is not limited to such an embodiment. For example, the display control unit of the embodiment may be mounted on the reproduction/output processing part of the recording/reproducing apparatus shown in FIG. 4 and FIG. 5.

In this case, for example, the stereoscopic video stream and the overlay bitmap to be displayed on the display of the camcorder, the image-pickup/recording apparatus, may be displayed while being processed in response to the display control mode by the display control unit. Furthermore, the device having the display control unit in the above embodiment is a reproducing apparatus, but not limited thereto. Alternatively, it may be applicable to a recording/reproducing apparatus, an image pick-up recording/reproducing apparatus, and any apparatus having a function of reproducing a stereoscopic video stream.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a depth-information detecting section detecting, based on a depth information representing a position of an object in stereoscopic video data in a depth direction, a peak position of said object in said depth direction as a peak value, at which said object is displayed at a front in an additional information display area where additional information data is superimposed and displayed with said stereoscopic video data;
   a comparison/detection section making a comparison between depth information of said additional information and said peak value of said stereoscopic video data to detect a positional relationship between said stereoscopic data and said display position of said additional information in said depth direction in said additional information display area; and
   a control unit controlling said stereoscopic video data and said display position of said additional information,
   in which said peak value represents a maximum video depth value in a basic unit of said stereoscopic video data,
   in which said depth-information detecting section detects an average value which is an average of positions in said depth direction at which said object is displayed in said additional information display area for said basic unit of said stereoscopic video data, such that said depth-information detecting section detects both a respective average value and a respective peak value for a respective basic unit of said stereoscopic video data,
   in which said basic unit represents a group of pictures (GOP),
   in which the respective average value and the respective peak value are obtained for each GOP according to auto focus (AF) control information of a camera unit and are both recorded in a MDP (modified DV or digital video pack) portion for the respective GOP unit of said stereoscopic video data, such that a GOP peak value and a GOP average value are recorded in the MDP portion for the respective GOP unit, in which said comparison/detection section makes a comparison between said position of said additional information data in said depth direction and said average value to detect a positional relationship between said object of said stereoscopic video data and said additional information in said additional information display area; and
   in which the control unit controls said stereoscopic video data and said display position of said additional information in response to the positional relationships between said stereoscopic video data and said display position of said additional information obtained by use of the average value and the peak value for said GOP unit of said stereoscopic video data.

2. The information processing apparatus according to claim 1, wherein
when said comparison/detection section determines that said object of said stereoscopic video data is displayed in the front of said additional information, said control unit displays said object of said stereoscopic video data in said additional information display area at a back of said additional information.

3. The information processing apparatus according to claim 2, further comprising:
an overtime detection unit detecting an overtime where said object of said stereoscopic video data is displayed in the front of said additional information by said comparison/detection section, wherein
when said overtime exceeds a first threshold time, said control unit displays said object of said stereoscopic video data at the back of said additional information in said additional information display area.

4. The information processing apparatus according to claim 3, wherein
when said overtime exceeds said first threshold time, said control unit provides a user with a message that allows said user to determine whether display control of said stereoscopic video data and said additional information data should be performed.

5. The information processing apparatus according to claim 2, wherein
said control unit displays a background video of said additional information data with increased transparency to allow said object of said stereoscopic video data superimposed with said background video to be visually recognized.

6. The information processing apparatus according to claim 1, wherein
when said comparison/detection section determines that said object of said stereoscopic video data is displayed in the front of said additional information, said control unit displays said additional information data so that a portion superimposed with said object of said stereoscopic video data is hidden behind said object.

7. The information processing apparatus according to claim 6, further comprising:
an overtime detection unit detecting an overtime where said object of said stereoscopic video data is displayed in the front of said additional information by said comparison/detection section, wherein
when said overtime exceeds a second threshold time, said control unit displays said additional information data so that a portion superimposed with said object of said stereoscopic video data is hidden behind said object.

8. The information processing apparatus according to claim 7, further comprising:
when said overtime exceeds said second threshold time, said control unit provides a user with a message that allows said user to determine whether display control of said stereoscopic video data and said additional information data should be performed.

9. The information processing apparatus according to claim 1, wherein
said display position of said additional information data in said depth direction is a fixed position.

10. The information processing apparatus according to claim 1, wherein
said stereoscopic video data and said additional information data are recorded in AVCHD format.

11. The information processing apparatus according to claim 10, wherein
depth information for every said GOP unit of said stereoscopic video data is recorded together with said stereoscopic video data for every said GOP unit concerned.

12. The information processing apparatus according to claim 1, in which a peak value and an average value in a video chapter are obtained by use of the average value and the peak value of each said GOP.

13. A information processing method, comprising the steps of:
detecting, based on a depth information representing a position of an object in stereoscopic video data in a depth direction, a peak position of said object in said depth direction as a peak value, at which said object of said stereoscopic video data is displayed at the front in an additional information display area where additional information data is superimposed and displayed with said stereoscopic video data;
making a comparison between depth information of said additional information and said peak value of said stereoscopic video data;
detecting a positional relationship between said stereoscopic data and said display position of said additional information in said depth direction in said additional information display area from a result of making said comparison between depth information of said additional information and said peak value of said stereoscopic video data;
in which said peak value represents a maximum video depth value in a basic unit of said stereoscopic video data,
and further comprising the steps of
detecting an average value which is an average of positions in said depth direction at which said object is displayed in said additional information display area for said basic unit of said stereoscopic video data, such that both a respective average value and a respective peak value for a respective basic unit of said stereoscopic video data are detected,
in which said basic unit represents a group of pictures (GOP), and in which the respective average value and the respective peak value are obtained for each GOP according to auto focus (AF) control information of a camera unit and are both recorded in a MDP (modified DV or digital video pack) portion for the respective GOP unit of said stereoscopic video data, such that a GOP peak value and a GOP average value are recorded in the MDP portion for the respective GOP unit,
making a comparison between said position of said additional information data in said depth direction and said average value to detect a positional relationship between said object of said stereoscopic video data and said additional information in said additional information display area; and
controlling said stereoscopic video data and said display position of said additional information in response to the positional relationships between said stereoscopic video data and said display position of said additional information obtained by use of the average value and the peak value for said GOP unit of said stereoscopic video data.

14. The information processing method according to claim 13, in which a peak value and an average value in a video chapter are obtained by use of the average value and the peak value of each said GOP.

* * * * *